(12) United States Patent
Miller et al.

(10) Patent No.: US 10,286,586 B2
(45) Date of Patent: May 14, 2019

(54) MULTI-COMPONENT SYNTHETIC CLOSURE AND METHOD OF MANUFACTURE THEREOF

(71) Applicant: VINVENTIONS USA, LLC, Zebulon, NC (US)

(72) Inventors: Darrell James Miller, Holly Springs, NC (US); Andre Deon Olivier, Cary, NC (US); James Edward Cooper, Jr., Bailey, NC (US)

(73) Assignee: VINVENTIONS USA, LLC, Zebulon, NC (US)

( * ) Notice: Subject to any disclaimer, the term of this patent is extended or adjusted under 35 U.S.C. 154(b) by 0 days.

(21) Appl. No.: 14/744,692

(22) Filed: Jun. 19, 2015

(65) Prior Publication Data

US 2015/0367551 A1 Dec. 24, 2015

Related U.S. Application Data

(60) Provisional application No. 62/015,037, filed on Jun. 20, 2014.

(51) Int. Cl.
*B65D 39/00* (2006.01)
*B29C 47/00* (2006.01)
(Continued)

(52) U.S. Cl.
CPC ............ *B29C 47/0064* (2013.01); *B26D 3/16* (2013.01); *B26D 5/007* (2013.01); *B26D 5/32* (2013.01);
(Continued)

(58) Field of Classification Search
CPC ... B65D 39/0058; B65D 59/02; B65D 39/008
See application file for complete search history.

(56) References Cited

U.S. PATENT DOCUMENTS 3,589,280 A 6/1971 Wilde
3,788,863 A * 1/1974 Scheuer ................. B41M 3/001
106/31.32

(Continued)

FOREIGN PATENT DOCUMENTS

EP 2628576 A1 8/2013
WO 03066512 A1 8/2003
(Continued)

OTHER PUBLICATIONS

International Preliminary Report on Patentability for PCT/US2015/036705, dated Dec. 29, 2016, 17 pages.
(Continued)

*Primary Examiner* — Andrew T Kirsch
(74) *Attorney, Agent, or Firm* — Withrow & Terranova, P.L.L.C.

(57) ABSTRACT

A multi-component synthetic closure and/or a rod-shaped intermediate product which incorporate printed indicia comprising ink that is invisible under normal lighting and/or temperature conditions and a continuous, in-line manufacturing process therefor are described. In the preferred embodiment of the present disclosure, the core member of the synthetic closure and/or the rod-shaped intermediate product can be formed by a continuous extrusion process which enables the core to be manufactured as an elongated, continuous length of material. As the continuous elongated length of extruded material forming the central core is advanced from the extruder towards an outer skin forming station, the central core passes through a printing station for forming any desired indicia among which can be a registration mark that can be invisible under normal lighting and/or temperature conditions on the outer surface of the central core prior to the application of the outer skin layer.

30 Claims, 3 Drawing Sheets

(51) Int. Cl.
*B29C 35/04* (2006.01)
*B29C 35/08* (2006.01)
*B65D 59/02* (2006.01)
*B29C 47/02* (2006.01)
*B26D 3/16* (2006.01)
*B26D 5/00* (2006.01)
*B26D 5/32* (2006.01)
*B26D 5/34* (2006.01)
*B41J 3/407* (2006.01)
*B29K 101/12* (2006.01)
*B29L 31/56* (2006.01)
*B29K 105/04* (2006.01)
*B29C 47/28* (2006.01)

(52) U.S. Cl.
CPC .............. *B26D 5/34* (2013.01); *B29C 35/045* (2013.01); *B29C 35/0805* (2013.01); *B29C 35/0866* (2013.01); *B29C 47/0016* (2013.01); *B29C 47/0066* (2013.01); *B29C 47/0069* (2013.01); *B29C 47/025* (2013.01); *B41J 3/407* (2013.01); *B41J 3/4073* (2013.01); *B65D 39/0011* (2013.01); *B65D 59/02* (2013.01); *B29C 47/0042* (2013.01); *B29C 47/026* (2013.01); *B29C 47/28* (2013.01); *B29C 2035/0822* (2013.01); *B29C 2035/0827* (2013.01); *B29C 2795/007* (2013.01); *B29K 2101/12* (2013.01); *B29K 2105/04* (2013.01); *B29K 2105/046* (2013.01); *B29K 2995/0026* (2013.01); *B29K 2995/0027* (2013.01); *B29K 2995/0069* (2013.01); *B29L 2031/565* (2013.01)

(56) References Cited

U.S. PATENT DOCUMENTS

| | | | | |
|---|---|---|---|---|
| 3,955,502 A | * | 5/1976 | VON Hofe | B31D 1/021 101/181 |
| 5,490,956 A | * | 2/1996 | Kito | B41M 5/305 106/493 |
| 6,581,839 B1 | * | 6/2003 | Lasch | G06K 7/0013 235/468 |
| 6,592,972 B1 | * | 7/2003 | Trantoul | B41M 3/14 428/195.1 |
| 6,672,718 B1 | * | 1/2004 | Stovold | C09D 11/38 347/100 |
| 7,117,512 B1 | * | 10/2006 | Cahill | G06K 19/041 720/745 |
| 7,394,383 B2 | | 7/2008 | Hager et al. | |
| 7,770,747 B2 | * | 8/2010 | Lauer | B65D 39/0005 215/299 |
| 2003/0099379 A1 | * | 5/2003 | Monk | G06K 9/00442 382/115 |
| 2003/0129283 A1 | | 7/2003 | Martinez Carballido | |
| 2003/0207138 A1 | * | 11/2003 | Kong | B32B 27/32 428/515 |
| 2005/0100751 A1 | * | 5/2005 | Nishizawa | B32B 7/10 428/515 |
| 2007/0212501 A1 | * | 9/2007 | Wolfe | A47G 19/2227 428/34.1 |
| 2009/0130350 A1 | | 5/2009 | Lauer et al. | |
| 2013/0161387 A1 | * | 6/2013 | King | G07D 7/00 235/431 |

FOREIGN PATENT DOCUMENTS

| | | |
|---|---|---|
| WO | 2009063095 A2 | 5/2009 |
| WO | 2013184890 A1 | 12/2013 |
| WO | 20140007807 A1 | 1/2014 |

OTHER PUBLICATIONS

International Search Report and Written Opinion for PCT/US2015/036705, dated Feb. 9, 2016, 23 pages.

Invitation to Pay Additional Fees and Partial Search Report for PCT/US2015/036705, dated Oct. 23, 2015, 8 pages.

* cited by examiner

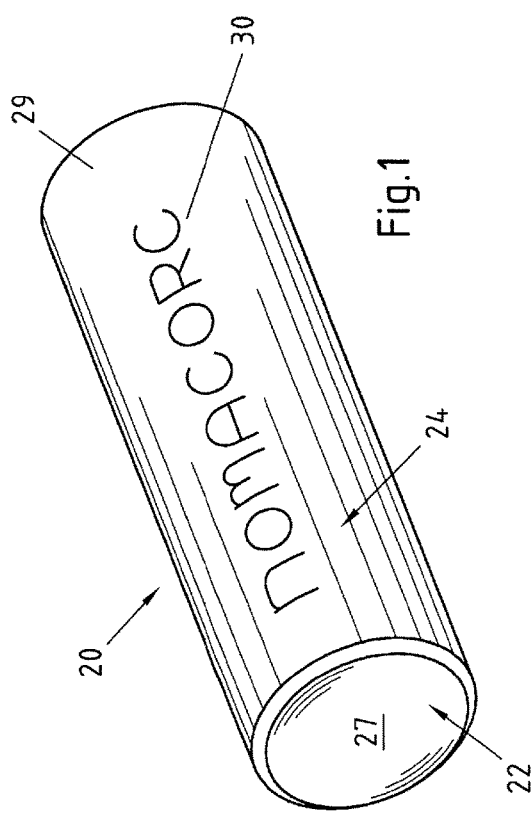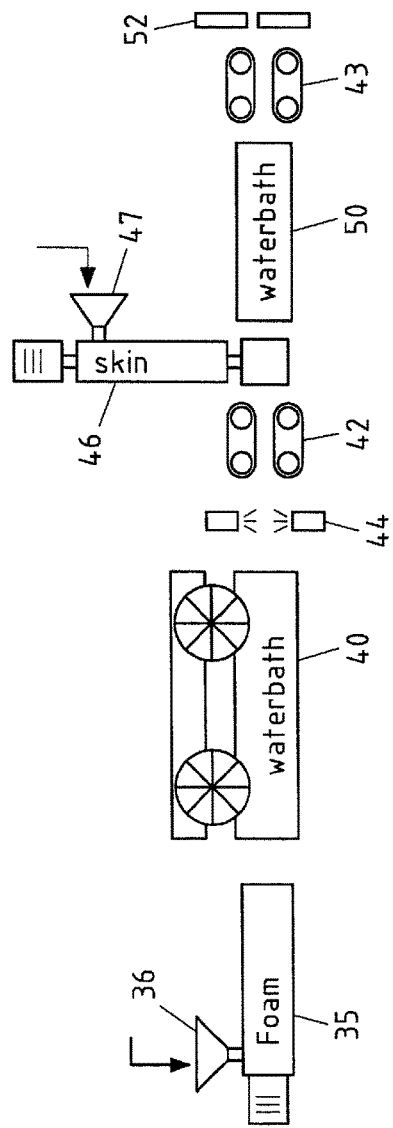

MULTI-COMPONENT SYNTHETIC CLOSURE AND METHOD OF MANUFACTURE THEREOF

PRIORITY APPLICATION

The present application claims priority to U.S. Provisional Patent Application Ser. No. 62/015,037 filed on Jun. 20, 2014 entitled "MULTI-COMPONENT SYNTHETIC CLOSURE AND METHOD OF MANUFACTURE THEREOF," which is incorporated herein by reference in its entirety.

TECHNICAL FIELD

This disclosure relates to closures or stoppers for containers containing liquids, low viscosity substrates, and small solids, and more particularly, to closures or stoppers formed from synthetic materials and employable as a bottle stopper for a container.

BACKGROUND

In view of the wide variety of products that are sold for being dispensed from containers, particularly containers with round necks which define the dispensing portal, numerous constructions have evolved for container stoppers or closure means for the portals. Generally, products such as vinegar, vegetable oils, laboratory liquids, detergents, honey, condiments, spices, alcoholic beverages, and the like, impose similar requirements on the type and construction of the closure means used for containers for these products. However, wine sold in bottles represents the most demanding product for bottle closure means, due to the numerous and burdensome requirements placed upon the closure means used for wine bottles. In view of these demands, most wine bottle closures or stoppers have been produced from a natural material known as "cork".

Although synthetic materials have been proposed for use as wine bottle stoppers or closures, such products have been unable to satisfy all of the stringent requirements. As a result, cork has remained the dominant material for wine closures, in spite of the numerous inherent problems that exist with cork.

Cork represents the bark of a particular variety of cork oak, *quercus suber*, a tree of the oak family characteristic of western Mediterranean countries, such as Portugal, Spain, Algeria, Morocco, France, Italy, and Tunisia, that has the ability to renew its bark indefinitely. Cork is a vegetable plant comprising tissue made up of dead microcells, generally 14-sided polyhedrons, slotting in one against the other, with the intercell space filled with a gaseous mixture, essentially atmospheric air but without the carbon dioxide. It is estimated that 1 cm$^3$ of cork numbers 15 to 40 million hexagonal cells with the thickness of the cellular membranes varying between 1 and 2.5 microns.

The suberose texture is not arranged in a uniform fashion. It is crisscrossed within its thickness by pores or ducts with walls more or less lignified, forming the lenticels. These are filled with powder of a reddish-brown color, rich in tannin. The lenticels are permeable to gases and liquids and they are often invaded by molds and other microorganisms.

The unevenness, both in membrane thickness and in the height and diameter of the cell forming the suberose parenchyma, can affect some of the cork's mechanical and physical properties, namely its compressibility and elasticity. The cork oak being able to keep its physiological process active at all times, the difference in cell size and the thickness of the cellular membrane between cork produced in spring and the succeeding autumn leave discernible rings showing the extent of each year's growth.

The contents of newly formed cells disappear during growth and the subsequent process of suberization of the membranes, on completion of which all communication with the plant's living tissues ceases. The uniqueness of *quercus suber* is the achieved thickness of cork bark, up to several centimeters, which insulates the tree from heat and loss of moisture and protects it from damage by animals.

In order to harvest the thick cork bark for the first time, the growth cycle takes between 20 and 30 years, depending on location, weather conditions etc. yielding the so-called virgin cork. Afterwards, some 10 years are needed between each harvest of cork boards or reproduction cork in order to gain the necessary length or diameter for some corks. Due to this process, the cork used for the manufacture of bottle closures is a reproduction of cork that is formed again after several barking phases.

The properties of cork derive naturally from the structure and chemical composition of the membranes. Because 89.7% of the tissue consists of gaseous matter, the density of cork is extremely low, about 120 to 200 kg/m$^3$, which makes the cork light and a good insulator. Density differences can be explained by the humidity differences, the age and quality of the cork bark and the cork tree and its growth differences. The cellular membranes are very flexible, rendering the cork both compressible and elastic. Elasticity enables it to rapidly recover to its original dimensions after any deformation. Its chemical composition gives the cork the property of repelling moisture. The walls of the cells are crusted with suberin, a complex mixture of fatty acids and heavy organic alcohols.

The value of cork is further increased by its low conductivity of heat, sound and vibration due to the gaseous elements sealed in tiny, impervious compartments. Cork is also remarkably resistant to wear and has a high friction coefficient, thanks to the honeycomb structure of the suberose surface. Cork does not absorb dust and consequently does not cause allergies nor pose a risk to asthma sufferers. It is fire resistant, recyclable, environmentally friendly and a renewable product.

These advantages have made natural cork the preferred bottle closure for wine storage, particularly for medium and high quality wines where tradition, the wine mystique and the bottle opening ritual with a corkscrew, are a very important, though intangible, aspect of the wine consumption. However, numerous disadvantages of natural cork also exist and derive naturally from the structure and chemical composition of the membranes.

Because cork is a natural product, it is a limited resource. Its limitations become even more obvious with the following facts: the natural growing of cork is geographically limited to the western Mediterranean countries; the world wide annual harvest of cork oak bark is 500,000 tons and can barely be increased, because of climatic and ecological reasons; and ten-year cycles are needed between each harvest of cork boards. In order to meet the rising worldwide cork demand, the pare cycles of cork have been shortened, leading to inferior qualities and constantly rising raw material prices.

The irregularities of the cork's structure due to geographic, climatic and ecological reasons cause many quality variances. This creates a complex categorization of qualities and standards. Through different types of washing processes, various chemical agents are combined in order to decontaminate the cork and to treat the appearance of the cork. High quality corks do not need washing. The cork quality is graded, based on the number of lenticels, horizontal and vertical cracks, their sizes, and other cork specific characteristics. The grading process is a subjective task based on statistically significant populations which is difficult to perform due to its natural origin, since every cork looks, feels, functions and smells different.

Wine market experts estimate that 1% to 5% of all bottled wine is spoiled by cork taint. At least six chemical compounds have been associated with cork taint in wines. Most frequently, 2,4,6-trichloranisole (TCA) is the major culprit responsible for the offensive off-odor and impact on the flavor of the wine. TCA has an extremely low threshold for odor detection. It is detectable at concentrations as low as 1 ppt or 1.0 nanogram per liter.

In most cases, cork taint does not involve the wine-making process. Typically, the tainting chemical is not found in vineyards or in parts of the winery where the wine is produced. After the wine is bottled, the defect shows itself, thus spoiling the wine. It is almost exclusively associated with corks.

Also, there is evidence that once the corks have been treated with chlorine, and are brought into interaction with mold fungus through humidity, chloranisole is created. Other types of wine spoilage are caused by oxidation, hydrogen sulfide, volatile acidity, sulfur dioxide, brettanomyces, and mercaptans.

Another problem commonly found with natural cork is leaking bottles. Typically, the lack of tightness between the cork and the neck of the bottle causes 10% to 20% of bottle leakage. However, the majority of wine leakage is caused by passage of the wine through the cork body. These problems are most often found with lower quality cork material, which is typically porous, too soft, out of round, or out of the predetermined specifications.

In view of the fact that wine spoilage is caused by oxidation of the wine, any gas exchange between ambient conditions and the interior of the wine bottle must be avoided. However, many corks are deformed by the chops or jaws of the bottle corking equipment, which enables air exchange and oxidation to occur. Furthermore, when bottles are stored in an environment where ideal humidity is not maintained, optimum functionality of the cork is not achieved and the cork loses its efficiency as a sealing medium by drying out, becoming brittle and/or losing its mechanical properties. These problems often cause the cork to break when pulled out of the bottle or enable wine spoilage to occur. In addition, natural cork absorbs liquids, depending on its structure and quality. This also results in breakage, while the cork is pulled out of the bottle.

Further problems or deficiencies found with natural cork are the propensity of cork worms to store or lay their eggs on the cork material, enabling the larvae to dig gullies into the cork. Consequently, enlarged apertures or channels are formed in the cork, unknown to the bottler, producing unwanted contamination. In addition to these drawbacks, cork powder and other cork impurities are often able to fall into the wine during the corking process, causing further problems for wine bottlers and unwanted surprises for the wine consumer.

In order to avoid some of the difficulties, bottlers have developed various spray coatings, such as paraffins, silicones and polymer materials, in an attempt to ease the movement of the cork into and out of the bottle, as well as to improve the permeability of the cork and fill imperfections in the cork surface. However, no ideal cork spray coating product has been developed to protect a wine corking member from all of the inherent difficulties or drawbacks of the material.

The vast majority of wine-containing bottles are currently being sold with natural cork stoppers. However, due to the inherent problems existing with natural cork, various other products have been developed to close liquid bearing containers, such as wine bottles. These other closures principally comprise structural synthetic plastics, crown cap metal stoppers, aluminum caps, plastic caps and combinations thereof.

In spite of these prior art efforts, a universally applicable closure has not been developed which satisfies all bottlers and consumer requirements. Particularly, the substantially burdensome requirements imposed upon closure means used in the wine industry have generally been employed as the standard that must be attained by a bottle closure that will be accepted by the industry. As a result of these stringent requirements, these prior art products have been incapable of satisfying the requisite needs of the industry.

In particular, one of the principal difficulties to which any bottle closure is subjected in the wine industry is the manner in which the closure is inserted into the bottle. Typically, the closure is placed in a jaw clamping member positioned above the bottle portal. The clamping member incorporates a plurality of separate and independent jaw members which peripherally surround the closure member and are movable relative to each other to compress the closure member to a diameter substantially less than its original diameter. Once the closure member has been fully compressed, a plunger moves the closure means from the jaws directly into the neck of the bottle, where the closure member is capable of expanding into engagement with the interior diameter of the bottle neck and portal, thereby sealing the bottle and the contents thereof.

In view of the fact that the jaw members must be independent of each other and separately movable in order to enable the closure member to be compressed to the substantially reduced diameter, each jaw member comprises a sharp edge which is brought into direct engagement with the closure member when the closure member is fully compressed. Depending upon the composition of the closure member, score lines are frequently formed on the outer surface of the closure member, which prevents a complete, leak-free seal from being created when the closure member expands into engagement with the bottle neck.

As a result of this sealing system, closure members other than cork have not been accepted by the wine industry, due to their inability to withstand this conventional bottling and sealing method. Furthermore, many cork sealing members also incur damage during the bottling process, resulting in leakage or tainted wine.

Another problem inherent in the wine industry is the requirement that the wine stopper must be capable of withstanding a substantial pressure build up that occurs during the storage of the wine product after it has been bottled and sealed. Due to natural expansion of the wine during hotter months, pressure builds up, imposing a burden upon the bottle stopper that must be resisted without allowing the stopper to be displaced from the bottle. As a result, the bottle stopper employed for wine products must be capable of secure, intimate, frictional engagement with the bottle neck in order to resist any such pressure build up.

A further problem inherent in the wine industry is the requirement that secure, sealed engagement of the stopper with the neck of the bottle must be achieved virtually immediately after the stopper is inserted into the neck of the bottle. During normal wine processing, the stopper is compressed, as detailed above, and inserted into the neck of the bottle to enable the stopper to expand in place and seal the bottle. However, such expansion must occur immediately upon insertion into the bottle since many processors tip the bottle onto its side or neck down after the stopper is inserted into the bottle neck, allowing the bottle to remain stored in this position for extended periods of time. If the stopper is unable to rapidly expand into secure, intimate, frictional contact and engagement with the walls of the neck of the bottle, wine leakage will occur.

A further requirement imposed upon closures or stoppers for wine bottles is the requirement that the closure be removable from the bottle using a reasonable extraction force. Although actual extraction forces extend over a wide range, the generally accepted, conventional extraction force is typically below 100 pounds.

In achieving a commercially viable stopper or closure, a careful balance must be made between secure sealing and providing a reasonable extraction force for removal of the closure from the bottle. Since the requirements for these two characteristics are in direct opposition to each other, a careful balance must be achieved so that the stopper or closure is capable of securely sealing the wine in the bottle, preventing both leakage and gas transmission, while also being removable from the bottle without requiring an excessive extraction force.

Another requirement for commercially viable wine stoppers or closures is the ability for printed material to be placed on the outer surface of the wine closure or stopper in order to allow the wine company to display any desired names, logos, and the like directly on the wine stopper. Depending upon the particular composition of the wine stopper, the requirement for enabling printed material to be placed thereon often imposes difficult conditions and limitations on the construction and functioning of the stopper for its intended purpose.

It has been found with many prior art closures that the process required for enabling the synthetic closure to receive and retain the ink for displaying printed indicia and/or logos also interferes with maintaining a reasonable extraction force for the synthetic closure. In this regard, synthetic closures are required to be specially treated, in order to enable the surface of the synthetic closure to accept the printing ink. Typically, this treatment requires the outer surface of the synthetic closure to be exposed to a high-intensity corona, plasma, or flame.

Although the exposure of the synthetic closure to a high-intensity beam of corona, plasma, or flame typically enables the surface of the closure to receive and retain printing inks, the treatment has been found to have a deleterious effect on the outer surface of the synthetic closure. In this regard, it has been found that extraction forces required to remove the treated synthetic closure from a bottle or container continuously increase with the passage of time. As a result, one of the principal requirements for an effective synthetic closure is not attainable by such prior art products.

Furthermore, printing on the surface of polymeric material has its challenge regarding adhesion, scuff resistance, permanency of the print as well as approval of inks for use in contact with food. Common printing technologies in the field are based on wet ink solutions using either solvent-based, water-based or UV-curable inks. Most any wet ink process requires pre-treating the surface of the polymer in order to increase the bond ability and wet ability of the polymer. This is generally accomplished using corona, flame or plasma treatment process. In the case of UV-curable inks, the exposure to UV light causes the UV initiators in the ink to cross-link and form a more scratch resistant print. It has been documented that using pretreatment processes for preparing the surface of synthetic corks can negatively impact the polymer-glass interface in a way that excessive extraction forces are required to remove the closure from the bottle.

It is highly desirable to accomplish a scratch-resistant print on the surface of the cork to avoid any ink loss or ink transfer to the bottle neck during extraction of the closure. More recently, such developments have been accomplished by using hot stamping and laser marking technologies. Both combine the advantage of not requiring pre-treatment or curing operations. However, in the case of hot stamping the process is governed by heat transfer and is yielding fairly low rates. In the case of laser marking, polyolefin materials require the use of a marking additive to increase absorption and increase marking speed. Those additives have in the past been very costly. In a case of a single-component closure, the additive has to be incorporated into the entire closure, although only marking close to the surface is required.

When UV-curable inks are used, incomplete cross-linking of the ink can cause sensory problems in the wine due to unreacted monomers, in particular acrylates, that can taint the wine. To avoid this problem, the amount of ink has been reduced, so far, resulting in insufficiently dark print.

Most state-of-the-art printing technologies in the field rely on the use of cut corks for the printing process. This is particularly true for injection molded corks, but also applies to extruded corks. As an "offline" process, additional process steps of handling, storing, feeding and waiting are required prior to the printing process. In order to reduce these non-value added times, it is highly desirable to implement a printing process inline to the extrusion process and eliminate most or all non-value added times associated with the printing process.

In a manufacturing process for extruded synthetic closures comprising an inline printing process, several problems have been recognized in the past. Firstly, when the extruded material is cut into pieces with the desired length, it has been realized that the printed indicia are not always at the same position on a finished closure and, eventually, the indicia themselves are cut. Secondly, the cutting machine normally comprises an inline vision system that recognizes a registration mark on the extruded material that triggers the cut. In some cases, however, the indicia printed in addition to the registration mark have competed with the registration mark causing a mistrigger of the cutting machine. Thirdly, the ink is sometimes smeared after being applied to the extruded material or the closure.

Some of these problems might be solved by employing an invisible ink, that is an ink invisible to and/or not detectable by the human eye under normal lighting and/or temperature conditions to trigger the cutting machine. Changing the lighting conditions and/or the temperature and/or irradiating the ink with electromagnetic radiation of a certain frequency outside the visible spectrum such as x-ray, ultraviolet, infrared or radio frequency and/or applying a chemical reagent can visualize this invisible ink and/or make the ink detectable.

U.S. Pat. No. 3,589,280 describes an apparatus for printing of invisible indicia using ultraviolet ink on metal caps or containers. U.S. Pat. No. 7,394,383 describes containers for pharmaceutical products comprising a cap with indicia that may be visible or invisible when viewed under normal lighting conditions. The indicia are printed onto a film which is subsequently embedded into a polymeric material. US 2003/0129283 describes indicia printed onto metallic containers and/or closures which are visible under ultraviolet light. WO 2014/007807 describes printing invisible indicia both onto the top of a cork in a wine bottle and onto the glass of the bottle. US 2009/0130350 describes an inline printing process incorporated into a manufacturing process for synthetic closures by extrusion. So far, invisible ink has not been applied onto synthetic polymer closures directly. Additionally, invisible ink has not been applied to surfaces of a closure that can at least temporarily come into contact with the content of the container. This can cause problems as the ink may spoil the content of the container. Furthermore, in inline printing systems for closures prepared by continuous extrusion, irregularities in the cutting process have been observed. Another problem in this regard is smearing of the printed indicia during and/or after the manufacturing process.

In addition to the printing process, the closure requires a surface lubrication to enable cork insertion and extraction into the bottle. It is of great interest to also include this process into the extrusion process in order to obtain a finished product at the end of the extrusion line that can readily be packed and shipped. Lubricating agents used in the industry include silicone oils and paraffin. Printing after lubricating the surface is virtually impossible for most wet-ink and hot stamping processes. In the case of laser marking, a print after coating is obtainable. However, the use of additives and the capital cost of the equipment is cost prohibitive to the manufacturing process. In the case of producing a single-component closure, surface coating after inline printing could take the shape of inline spray-coating the surface of the extrusion rod after printing prior to cutting the corks. In the case of a multi-component closure (core with an outer layer) and crosshead extruding the product, it is possible to print after extruding the core and incorporating the lubrication function into the outer layer (e.g. incorporation of mineral oils or silicone oils into the formulation of the outer layer). Lubrication of the outer layer can be effected by adding a suitable additive or lubrication polymer (e.g. Teflon) into the formulation of the outer layer.

Another problem associated with the shipping of corks is the inefficient packing properties of the closures. Due to their substantially cylindrical shape with a low aspect ratio, packing of closures yields many voids when boxed resulting in unnecessarily large volume requirements.

It is an object of the present disclosure to provide a synthetic closure or stopper with indicia imprinted that are invisible under normal lighting and/or temperature conditions. The printed indicia should preferably not be smeared in the manufacturing process.

Another object of the present disclosure is to prevent or reduce irregularities in the cutting process.

Furthermore, the synthetic closure or stopper comprising artwork should preferably not taint wine.

Another object of the present disclosure is to provide a rod-shaped intermediate product that can be efficiently packed and cut into a plurality of closures or stoppers.

Another object of the present disclosure is to provide a synthetic closure or stopper having the characteristic features described above which is capable of providing a wide variety of alternate surface textures or treatments or visual appearances.

Other and more specific objects will in part be obvious and will in part appear hereinafter.

SUMMARY OF THE DETAILED DESCRIPTION

By employing the present disclosure, some or all of the difficulties and drawbacks found in the prior art have been overcome and a mass producible, resilient, synthetic bottle closure is realized by achieving a synthetic, extruded, foamed polymer core peripherally surrounded and integrally bonded with one or more cooperating, synthetic, separate, independent, extruded, outer layers or skin members. The present disclosure can be employed on any desired product, whether the product is a liquid, a viscous material, or a solid distributed in a bottle or container and dispensed through the open portal of the container neck.

As will become evident from the following detailed disclosure, the multi-component synthetic closure of the present disclosure may be employed as a bottle closure or stopper for any desired product. However, for the reasons detailed above, wine products impose the most burdensome standards and requirements on a bottle closure. Consequently, in order to clearly demonstrate the universal applicability of the multi-component synthetic closure of the present disclosure, the following disclosure focuses on the applicability and usability of the multi-component synthetic closure of the present disclosure as a closure or stopper for wine containing bottles. However, this discussion is for exemplary purposes only and is not intended as a limitation of the present disclosure.

As discussed above, a bottle closure or stopper for wine must be capable of performing numerous separate and distinct functions. One principal function is the ability to withstand the pressure build up due to temperature variations during storage, as well as prevent any seepage or leakage of the wine from the bottle. Furthermore, a tight seal must also be established to prevent unwanted gas exchange between ambient conditions and the bottle interior, so as to prevent any unwanted oxidation or permeation of gases from the wine to the atmosphere. In addition, the unique corking procedures employed in the wine industry also impart substantial restrictions on the bottle closure, requiring a bottle closure which is highly compressible, has high immediate compression recovery capabilities and can resist any deleterious effects caused by the clamping jaws of the bottle closure equipment.

Moreover, the bottle closure or stopper for wine needs to have indicia imprinted that are adapted to the customer needs, are preferably unsmeared and/or that must not taint the wine.

Although prior art synthetic products have been produced in an attempt to satisfy the need for alternate bottle closures employable in the wine industry, such prior art systems have been incapable of meeting all of the stringent requirements and demands imposed upon a bottle closure for wine products. However, by employing the present disclosure, some or all of the prior art inabilities have been obviated and an effective, easily employed, mass-produced synthetic closure has been realized.

Surprisingly, it has been found that some or all of the problems and disadvantages in the prior art can be overcome by incorporating the use of invisible ink into the manufacturing process. Moreover, a heat treatment after the printing step improved the overall production process. In addition, the use of solvent-based inks surprisingly resulted in smear-resistant indicia with the desired properties. Moreover, it has been found that the volume requirements for packing can be significantly reduced when the extruded material is cut into rod-shaped intermediate products rather than individual closures.

The present disclosure overcomes some or all of the prior art problems by achieving a multi-component synthetic closure which possesses physical properties substantially equal to or better than the physical properties found in cork material, which has caused such cork material to be the principal closure material for wine bottles. In the present disclosure, some or all of the prior art failings have been overcome by achieving a multi-component synthetic bottle closure which incorporates a central core member peripherally surrounded by and integrally bonded to a separate, independent outer peripheral layer or skin member which imparts additional, desirable physical characteristics to the effective outer surface of the synthetic bottle closure. By employing invisible ink to print on the components of the multi-component synthetic bottle closure of the present disclosure, some or all of the prior art difficulties and drawbacks have been eliminated and an effective, multipurpose, easily employed and economically mass produced synthetic closure is realized.

Thus, in one embodiment (herein referred to as closure A), the present disclosure provides for a multi-component, substantially cylindrical closure for being inserted and securely retained in a portal-forming neck of a container, said closure comprising i. a core member comprising at least one thermoplastic polymer,
ii. a peripheral layer at least partially surrounding and intimately bonded to the core member, said peripheral layer comprising at least one thermoplastic polymer,
iii. optionally, at least one further peripheral layer at least partially surrounding and intimately bonded to the respective outermost peripheral layer, said at least one further peripheral layer comprising at least one thermoplastic polymer, and
iv. indicia printed on the lateral surface of the core member or on the lateral surface of at least one peripheral layer, wherein said at least one peripheral layer comprising the printed indicia is at least partially surrounded by and intimately bonded to a further peripheral layer being in overlying relationship with the printed indicia, and wherein the indicia comprise at least one of visible ink and invisible ink. Preferably, the indicia comprise a solvent-based ink. In another embodiment of the present disclosure, the indicia comprise a UV-curable ink.

In another embodiment (herein referred to as closure B), the present disclosure provides for a multi-component, substantially cylindrical closure for being inserted and securely retained in a portal-forming neck of a container, said closure comprising b. a core member comprising at least one thermoplastic polymer,
c. a peripheral layer at least partially surrounding and intimately bonded to the core member, said peripheral layer comprising at least one thermoplastic polymer,
d. optionally, at least one further peripheral layer at least partially surrounding and intimately bonded to the respective outermost peripheral layer, said at least one further peripheral layer comprising at least one thermoplastic polymer, and
e. indicia printed on the lateral surface of the core member or on the lateral surface of at least one peripheral layer, wherein said at least one peripheral layer comprising the printed indicia is at least partially surrounded by and intimately bonded to a further peripheral layer being in overlying relationship with the printed indicia, and wherein the indicia comprise a solvent-based ink. Preferably, the indicia comprise invisible ink.

In an exemplary aspect of the closures A and/or B according to the present disclosure, the indicia comprise a solvent-based ink and/or a UV-curable ink.

The following aspects apply equally to closures A and B. According to an aspect of the present disclosure, the indicia comprised on the closure may comprise different kinds of inks. The inks used according to the disclosure may differ in various aspects such as color, viscosity, detectability and/or visibility under normal lighting and/or temperature conditions, mode of application and/or curability. In one aspect of the present disclosure, the closure comprises indicia that comprise visible ink. In another aspect of the present disclosure, said indicia comprise visible and invisible ink.

Invisible ink in the context of this disclosure means that the ink is invisible to the human eye under normal lighting and/or temperature conditions. Normal lighting conditions in the context of this disclosure means light from a light source having a spectrum that substantially comprises the visible range of the spectrum. Normal temperature conditions in the context of this disclosure means a temperature from 10° C. to 35° C. Different methods exist to visualize and/or help to detect the invisible ink and, thus, the indicia printed with the invisible ink, depending on the type of ink employed. Thus, changing the lighting conditions and/or the temperature and/or irradiating the ink with electromagnetic radiation of a certain frequency outside the visible spectrum such as x-ray ultraviolet, infrared, or radio frequency and/or applying a chemical reagent can visualize and/or help to detect the invisible ink and, by that, also the indicia printed with the invisible ink. The method for visualization and/or detection of the invisible ink can permanently alter the ink. For example, the ink can be visible after the method for detection has been applied. The method for visualization and/or detection of the invisible ink can also leave the ink substantially unaltered or alteration of the ink can be temporary. If the ink is substantially unaltered after the method for detection has been applied or the alteration is temporary, the process for detection can be repeatable.

In one aspect, the present disclosure provides for a closure comprising indicia comprising invisible ink, said invisible ink being detectable under ultraviolet (UV) light. Suitable light sources are, for example, blacklights or low-powered UV lamps. The advantage of this kind of invisible ink is the fact that the ink is substantially not altered by the detection method. The detection method for this kind of ink is repeatable. In another aspect of the present disclosure, said invisible ink is detectable under infrared (IR) light. Suitable light sources are, for example, IR lamps. The advantage of this kind of invisible ink is the fact that the ink is substantially not altered by the detection method. The detection method for this kind of ink is repeatable. In another aspect of the present disclosure, said invisible ink is detectable at temperatures in the range of from 40 to 200° C. In the latter case, the substrate comprising the ink needs to be heated to this temperature. The temperature of the heating means, for example an oven or a heat gun, has to be adjusted accordingly. In another aspect of the present disclosure, said invisible ink is visible and/or detectable below a set temperature, for example below about 8° C., in particular at a temperature from −40° C. to 8° C. In this case, the substrate comprising the ink needs to be cooled to this temperature. Thermochromic ink can be used as an ink that is detectable and/or visible when heated or cooled to a certain temperature. In another aspect of the present disclosure, said invisible ink is detectable by a chemical reaction of the ink with a chemical reagent. Examples of chemical reagents that can be employed to help detect invisible ink are iodine, an acid, a base, or a pH indicator. Examples of invisible inks that are detected by a chemical reaction of the ink with a chemical reagent are vinegar, starch, and sodium chloride. In another aspect of the present disclosure, said invisible ink is detectable by irradiation with radiation from an x-ray source. The advantage of this kind of invisible ink is the fact that the ink is substantially not altered by the detection process. The detection process for this kind of ink is repeatable. In yet another aspect of the present disclosure, said invisible ink is detectable by irradiation with radiation from a radio frequency source. The advantage of this kind of invisible ink is the fact that the ink is substantially not altered by the detection process. The detection process for this kind of ink is repeatable.

According to an aspect of the disclosure, the indicia printed onto the closure can serve different purposes. The wine manufacturers often would like to print their company name and/or decorative indicia onto the closure. On the other hand, the indicia may serve as event triggers in the manufacturing process. For that purpose, it can be helpful when the indicia comprise a registration mark. It is desirable for the registration mark to be unmistakable, in particular by a recognition system. The indicia may also serve to provide additional information about the closure itself and/or the product in the container. The indicia may also serve to identify a genuine product and, in this way, help to reveal unauthorized copying. The indicia may also contain a secret code or a message. The indicia may also serve to promote a game or a sweepstake. According to the specific purpose of the indicia, a corresponding ink is used, for example visible and/or invisible ink.

In one aspect, the present disclosure provides for a closure comprising indicia wherein said indicia comprise a registration mark. Said registration mark is particularly helpful to distinguish the genuine closure from unauthorized copies. Preferably, the ink of the registration mark comprises invisible ink. When the registration mark comprises invisible ink, parts of the registration mark or the entire registration mark do not interfere with other indicia printed on the closure such as decorative indicia. This provides more flexibility for the indicia otherwise printed onto the closure. In another aspect of the present disclosure, said registration mark is detectable by a cutting machine. Advantageously, the registration mark defines the cutting position for a cutting machine in a continuous manufacturing process.

In another aspect of the present disclosure, the synthetic closure has a surface roughness $R_a$ measured by contact profilometry in the range of from 0.5 μm to 17 μm, particularly in the range of from 0.5 μm to 16 μm, particularly in the range of from 0.5 μm to 15 μm, particularly in the range of from 1 μm to 15 μm, particularly in the range of from 1 μm to 14 μm, 13 μm, 12 μm, 11 μm or 10 μm, particularly in the range of from 1 μm to 9 μm. A surface roughness in this range allows for an efficient printing. The surface roughness $R_a$ is the arithmetic average of the absolute measured values. Methods to determine the surface roughness $R_a$ are known to the skilled person.

According to another aspect of the present disclosure, the multi-component synthetic bottle closure comprises, as its principal component, the core member which is preferably formed from extruded, foamed, plastic polymers, copolymers, or homopolymers. According to one aspect of the present disclosure, said core member comprises at least one thermoplastic polymer. Although any known foamable plastic material can be employed in the extrusion process for developing the bottle closure of the present disclosure, the plastic material must be selected for producing physical properties similar to natural cork, so as to be capable of providing a synthetic closure for replacing natural cork as a closure for wine bottles. Preferably, the plastic material for the core member is a closed cell plastic material. Suitable plastic materials for the core member are, for example, polyethylenes, metallocene catalyst polyethylenes, polybutanes, polybutylenes, polyurethanes, silicones, vinyl-based resins, thermoplastic elastomers, polyesters, ethylenic acrylic copolymers, ethylene-vinyl-acetate copolymers, ethylene-methyl-acrylate copolymers, thermoplastic polyurethanes, thermoplastic olefins, thermoplastic vulcanizates, flexible polyolefins, fluorelastomers, fluoropolymers, polyethylenes, polytetrafluoroethylenes, and blends thereof, ethylene-butyl-acrylate copolymers, ethylene-propylene-rubber, styrene butadiene rubber, styrene butadiene block copolymers, ethylene-ethyl-acrylic copolymers, ionomers, polypropylenes, and copolymers of polypropylene and copolymerizable ethylenically unsaturated comonomers, olefin copolymers, olefin block copolymers, styrene ethylene butadiene styrene block copolymers, styrene ethylene butylene styrene block copolymers, styrene ethylene butylene block copolymers, styrene butadiene styrene block copolymers, styrene butadiene block copolymers, styrene isoprene styrene block copolymers, styrene isobutylene block copolymers, styrene isoprene block copolymers, styrene ethylene propylene styrene block copolymers, styrene ethylene propylene block copolymers, and/or mixtures thereof. A particularly preferred plastic material for the core element is polyethylene, in particular LDPE, and/or ethylene-vinyl-acetate copolymer (EVA). Preferably, the density of the core member in the final product is between about 100 to about 500 kg/m³, in particular between about 200 to about 400 kg/m³.

According to another aspect of the present disclosure, said core member comprises a plurality of cells. Such a plurality of cells can be achieved by employing a foamed plastic material. Synthetic closures comprising a plurality of cells in the core member have the advantage that they can be easily compressed in the corking process. Moreover, closures with a core member comprising a plurality of cells quickly revert back to the original size after compression.

According to another aspect of the present disclosure, the plurality of cells of the closure is further advantageously defined as being a plurality of substantially closed cells, or that the foam is a substantially closed cell foam. In particular, the core member is exemplarily defined as comprising substantially closed cells. Closed cell foams are generally defined as comprising cells, also referred to as pores, which are substantially not interconnected with each other. Closed cell foams have higher dimensional stability, lower moisture absorption coefficients and higher strength compared to open-cell-structured foams.

In order to assure that the core member of the closure possesses inherent consistency, stability, functionality and capability of providing long-term performance, at least one of the size and the distribution of the plurality of cells in the core member is particularly substantially uniform throughout at least one of the length and the diameter of the core member. According to an aspect of the synthetic closure according to the present disclosure, the plurality of cells comprises a cell size in a range of from about 0.025 mm to about 0.5 mm, in particular from about 0.05 mm to about 0.35 mm. The cell size is measured according to standard test methods known to the skilled person.

In another aspect of the present disclosure, the core member comprises closed cells having an average cell size ranging from about 0.02 millimeters to about 0.50 millimeters and/or a cell density ranging from about 8,000 cells/cm³ to about 25,000,000 cells/cm³. Although this cell configuration has been found to produce a highly effective product, it has been found that even more advantageous products are those wherein said core member comprises an average cell size ranging from about 0.05 mm to about 0.1 mm and/or a cell density ranging from about 1,000,000 cells/cm$^3$ to about 8,000,000 cells/cm$^3$.

In order to control the cell size in the core member of the closure, and attain the desired cell size detailed above, a nucleating agent can be employed. In an aspect of the disclosure, it has been found that by employing a nucleating agent selected from the group consisting of calcium silicate, talc, clay, titanium oxide, silica, barium sulfate, diatomaceous earth, and mixtures of citric acid and sodium bicarbonate, the desired cell density and cell size is achieved.

As is well known in the industry, a blowing agent can be employed in forming extruded material, for example extruded foam plastic material, such as is advantageous for the core member. In the present disclosure, a variety of blowing agents can be employed during the extrusion whereby the core member is produced. Typically, either physical blowing agents or chemical blowing agents are employed. Suitable blowing agents that have been found to be efficacious in producing the core member of the present disclosure comprise one or more selected from the group consisting of: aliphatic hydrocarbons having 1-9 carbon atoms, halogenated aliphatic hydrocarbons having 1-9 carbon atoms and aliphatic alcohols having 1-3 carbon atoms. Aliphatic hydrocarbons include methane, ethane, propane, n-butane, isobutane, n-pentane, isopentane, neopentane, and the like. Among halogenated hydrocarbons and fluorinated hydrocarbons they include, for example, methylfluoride, perfluoromethane, ethyl fluoride, 1,1-difluoroethane (HFC-152a), 1,1,1-trifluoroethane (HFC-430a), 1,1,1,2-tetrafluroethane (HFC-134a), pentafluoroethane, perfluoroethane, 2,2-difluoropropane, 1,1,1-trifluoropropane, perfluoropropane, perfluorobutane, perfluorocyclobutane. Partially hydrogenated chlorocarbon and chlorofluorocarbons for use in this disclosure include methyl chloride, methylene chloride, ethyl chloride, 1,1,1-trichlorethane, 1,1-dichloro-1-fluoroethane (HCFC-141b), 1-chloro-1,1-difluoroethane (HCFC-142b), 1,1-dichloro-2,2,2-trifluoroethane (HCFC-123) and 1-chloro-1,2,2,2-tetrafluoroethane (HCFC-124). Fully halogenated chlorofluorocarbons include trichloromonofluoromethane (CFC11), dichlorodifluoromethane (CFC-12), trichlorotrifluoroethane (CFC-113), dichlorotetrafluoroethane (CFC-114), chloroheptafluoropropane, and dichlorohexafluoropropane. Fully halogenated chlorofluorocarbons are not preferred due to their ozone depletion potential. Aliphatic alcohols include methanol, ethanol, n-propanol and isopropanol. Chemical blowing agents include azodicarbonamic, azodicarbonamide, azodiisobutyro-nitride, benzenesulfonhydrazide, 4,4-oxybenzene sulfonylsemicarbazide, p-toluene sulfonylsemicarbazide, barium azodicarboxlyate, N,N'-Dimethyl-N,N'-dinitrosoterephthalamide, and trihydrazinotriazine. An example of a suitable chemical blowing agent is sold by Clariant International Ltd, BU Masterbatches (Rothausstr. 61, 4132 Muttenz, Switzerland) under the tradename Hydrocerol®.

According to another aspect of the disclosure, inorganic, or physical, blowing agents are used in making the core member according to the present disclosure. Examples of inorganic blowing agents include carbon dioxide, water, air, helium, nitrogen, argon, and mixtures thereof. Carbon dioxide and nitrogen are particularly useful blowing agents.

Expandable microspheres can also be considered as blowing agent according to the present disclosure.

According to another aspect of the present disclosure, in order to produce the desired product, the blowing agent may be incorporated into the plastic material in a quantity ranging from about 0.005% to about 10% by weight of the weight of the plastic material. The term "plastic material" refers to the material from which at least one of the core member and the peripheral layer is formed, in particular the thermoplastic polymer or combination of thermoplastic polymers from which at least one of the core member and the peripheral layer is formed.

According to an aspect of the present disclosure, the closure has a substantially cylindrical shape comprising substantially flat terminating surfaces forming the opposed ends of said closure and the substantially flat terminating surfaces of the core member are substantially devoid of the peripheral layer. The closure has a substantially cylindrical form comprising a substantially cylindrical peripheral surface and two substantially flat terminating faces at the opposing ends of the cylindrical form. In addition to a core member which possesses a construction with physical characteristics similar to natural cork, and has a substantially cylindrical form with a substantially cylindrical peripheral surface, the closure comprises at least one peripheral layer at least partially surrounding and intimately bonded to at least one surface, particularly the substantially cylindrical surface, of the core member. The ends of the closure can be beveled or chamfered, as is known from the prior art. Although any desired bevel or chamfered configuration can be employed, such as a radius, curve, or flat surface, it has been found that merely cutting the terminating ends at the intersection with the longitudinal cylindrical surface of the elongated length of material, with or without at least one peripheral layer as described herein, at an angle in the range of from about 30° to about 75°, for example in the range of from about 35° to about 70°, particularly in the range of from about 40° to about 65°, allows formation of a closure which is easier to insert into the neck of a container. Angles of about 45°, 46°, 47°, 48°, 49°, 50°, 51°, 52°, 53°, 54°, 55°, 56°, 57°, 58°, 59° or 60° have been found particularly to contribute to the present disclosure. The bevel or chamfer angle is measured relative to the longitudinal axis of the cylindrical closure. The chamfer angle for a closure for a still wine bottle is particularly within the above ranges, particularly with a chamfer length in the range of from about 0.4 mm to about 2.5 mm, particularly in the range of from about 0.5 mm to about 2.0 mm. Closures for sparkling wine bottles advantageously have a chamfer in the above range, but generally have a deeper and/or longer chamfer than closures for still wine bottles, for example having a chamfer angle in the range of from about 35° to about 55°, particularly in the range of from about 40° to about 50°, more particularly a chamfer angle of about 40°, 41°, 42°, 43°, 44°, 45°, 46°, 47°, 48°, 49° or 50°, and/or a chamfer length in the range of from about 3 mm to about 8 mm, particularly in the range of from about 4 mm to about 7 mm, particularly a chamfer length of about 3 mm, 4 mm, 5 mm, 6 mm, 7 mm or 8 mm. In addition, an end cap can be attached to one of said flat terminating surfaces of the closure. Said end cap can be made from any material, preferably from a plastic material. Preferably the end cap has a circular cross-section with a diameter larger than the diameter of the closure.

According to another aspect of the present disclosure, the core member may further comprise at least one of at least one fatty acid and at least one fatty acid derivative. In order to achieve this, one or more fatty acid derivatives can be added to the at least one thermoplastic polymer which is used to prepare the core member. Exemplary fatty acid derivatives according to the present disclosure are fatty acid esters or fatty acid amides such as stearamides. The addition of at least one fatty acid derivative to the polymer composition of the synthetic closure imparts superior properties to the synthetic closure. In particular, it has been found that the oxygen transfer rate (OTR) of the closure can be reduced substantially, thus further reducing unwanted oxidation of wine. In addition, it has been found that the use of a fatty acid derivative as additive does not have a negative impact on the performance characteristics of synthetic corks such as extraction force, ovality control, diameter control and length control. In order to impart the desired OTR-reducing effect to the closure, the fatty acid derivative, if present, is used according to an aspect of the present disclosure in a concentration from about 0.01 wt. % to about 10 wt. %, in particular from about 0.1 wt. % to about 5 wt. %, more particularly from about 1 wt. % to about 3 wt. %, based on the total weight of thermoplastic polymer.

Regardless of the thermoplastic polymer or thermoplastic polymers selected for forming the core member, in a further aspect of the present disclosure, said core member is further defined as comprising a density ranging from about 100 kg/m$^3$ to about 600 kg/m$^3$. Although this density range has been found to provide an effective core member, according to another aspect of the present disclosure, the density ranges from about 100 kg/m$^3$ to about 500 kg/m$^3$, in particular from about 150 kg/m$^3$ to about 420 kg/m$^3$, more particularly from about 200 kg/m$^3$ to about 350 kg/m$^3$.

By employing the present disclosure, a synthetic bottle closure can be produced in a highly automated, high-tech extrusion process with product tolerances being closely maintained. As a result, various prior art difficulties encountered with cork products being out of round or having improper diameters can be overcome.

According to an aspect of the present disclosure, the unique synthetic bottle closure is realized by forming at least one outer layer peripherally surrounding the core member in intimate, bonded, interengagement therewith. The at least one outer, peripheral layer of the synthetic closure is formed from foam or non-foam plastic material. According to an aspect of the disclosure, a particularly effective product is obtained when the at least one peripheral layer of the closure according to the disclosure comprises at least one thermoplastic polymer. Preferably, said at least one thermoplastic polymer is a polymer selected from the list of polymers detailed for the core member above. However, according to an aspect of the present disclosure, the outer peripherally surrounding layer is formed with a substantially greater density in order to impart desired physical characteristics to the synthetic bottle closure. Preferably, the at least one peripheral layer is formed from one or more of the following plastic materials: polyethylenes, metallocene catalyst polyethylenes, polybutanes, polybutylenes, polyurethanes, silicones, vinyl-based resins, thermoplastic elastomers, polyesters, ethylenic acrylic copolymers, ethylene-vinyl-acetate copolymers, ethylene-methyl-acrylate copolymers, thermoplastic polyurethanes, thermoplastic olefins, thermoplastic vulcanizates, flexible polyolefins, fluoroelastomers, fluoropolymers, polyethylenes, polytetrafluoroethylenes, and blends thereof, ethylene-butyl-acrylate copolymers, ethylene-propylene-rubber, styrene butadiene rubber, styrene butadiene block copolymers, ethylene-ethyl-acrylic copolymers, ionomers, polypropylenes, and copolymers of polypropylene and copolymerizable ethylenically unsaturated comonomers, olefin copolymers, olefin block copolymers, styrene ethylene butadiene styrene block copolymers, styrene ethylene butylene styrene block copolymers, styrene ethylene butylene block copolymers, styrene butadiene styrene block copolymers, styrene butadiene block copolymers, styrene isoprene styrene block copolymers, styrene isobutylene block copolymers, styrene isoprene block copolymers, styrene ethylene propylene styrene block copolymers, styrene ethylene propylene block copolymers, and/or mixtures thereof. A particularly preferred plastic material for the peripheral layer is a thermoplastic vulcanizate and/or styrene ethylene butylene styrene block copolymers. Preferably, the at least one peripheral layer is formed from a transparent plastic material. Preferably, the plastic material selected for the at least one peripheral layer is different from that of the core member.

In order to provide a closure that is still easily compressed and quickly reverts back to its original size after compression, it has been found that according to an aspect of the present disclosure, said at least one peripheral layer of the closure according to the disclosure advantageously comprises a thickness ranging from 0.05 mm to 5 mm, in particular from 0.1 mm to 2 mm.

As the clamping jaws of the corking equipment employed in the corking process of wine bottles may be sharp and have the ability to scratch the surface of the closure leading to leakage of the wine out of the container, according to an aspect of the present disclosure, said at least one peripheral layer of the closure preferably is further defined as comprising a tough, score and mar resistant surface. It is further advantageous if said at least one peripheral layer is further defined as comprising a density from 300 kg/m$^3$ to 1500 kg/m$^3$, in particular from 750 kg/m$^3$ to 1100 kg/m$^3$.

In one aspect of the present disclosure, the closure according to the disclosure preferably has an overall density of from about 100 kg/m$^3$ to about 800 kg/m$^3$, in particular from about 150 kg/m$^3$ to about 500 kg/m$^3$, in particular from about 200 kg/m$^3$ to about 500 kg/m$^3$, in particular from about 200 kg/m$^3$ to about 400 kg/m$^3$, in particular from about 200 kg/m$^3$ to about 375 kg/m$^3$.

According to an aspect of the present disclosure, depending upon the sealing process employed for inserting the synthetic closure in a desired bottle, additives, such as slip additives, may be incorporated into the outer, peripherally surrounding layer of the synthetic closure to provide lubrication of the synthetic closure during the insertion process. In addition, according to an aspect of the present disclosure, other additives typically employed in the bottling industry may also be incorporated into the synthetic closure for improving the sealing engagement of the synthetic closure with the bottle as well as reducing the extraction forces necessary to remove the synthetic closure from the bottle for opening the bottle.

As the place where the closures are manufactured is usually away from the place where the bottles are sealed, volume-efficient packing of the closures is necessary. It has been found that the closures according to the disclosure can be packed volume efficiently when they are not cut into the desired size immediately at the manufacturing site, but are shipped as rod-shaped intermediate products with a length of a plurality of the length of the closures according to the disclosure, which are later cut into the desired size of the closures.

Plurality in the context of the present disclosure means at least two.

Therefore, according to another embodiment (herein referred to as rod-shaped intermediate product), the present disclosure provides for a substantially rod-shaped intermediate product for the preparation of multi-component, substantially cylindrical closures for being inserted and securely retained in a portal-forming neck of a container, said rod-shaped intermediate product comprising f. a core member comprising at least one thermoplastic polymer, g. a peripheral layer at least partially surrounding and intimately bonded to the core member, said peripheral layer comprising at least one thermoplastic polymer, h. optionally, at least one further peripheral layer at least partially surrounding and intimately bonded to the respective outermost peripheral layer, said at least one further peripheral layer comprising at least one thermoplastic polymer, and i. indicia printed on the lateral surface of the core member or on the lateral surface of at least one peripheral layer, wherein said at least one peripheral layer comprising the printed indicia is at least partially surrounded by and intimately bonded to a further peripheral layer being in overlying relationship with the printed indicia, and wherein the indicia comprise at least one of visible ink and invisible ink. Preferably, said indicia comprise visible and invisible ink.

The indicia comprised on the rod-shaped intermediate product have substantially the same properties as the indicia comprised on closures A and/or B according to the disclosure.

Moreover, to facilitate recognition of the indicia printed with invisible ink, it has been found advantageous for said invisible ink comprised in the indicia on the rod-shaped intermediate product according to the disclosure to be detectable by at least one of illuminating with UV light, illuminating with IR light, irradiating with radiation from an x-ray source, irradiating with radiation from a radio frequency source, heating the rod-shaped product to temperatures in the range of from 40 to 200° C., cooling the rod-shaped intermediate product, in particular cooling the rod-shaped intermediate product to temperatures below about 8° C., in particular to a temperature from −40° C. to 8° C., and a chemical reaction of the ink with a chemical reagent.

For a particularly effective cutting after shipping, it has been found that said rod-shaped intermediate product according to the disclosure comprises the indicia repeatedly at regular intervals. Although this already provides for an efficient product, it has been found to be even more advantageous, when said indicia comprise a registration mark. It has been found to be most effective, when said registration mark is detectable by a cutting machine.

According to an aspect of the disclosure, the rod-shaped intermediate product is coiled and/or wound around an object for shipping. A suitable object around which the rod-shaped intermediate product can be coiled and/or wound can be a cylindrical object.

In general, the rod-shaped intermediate product has the same properties as the closures A and/or B with all their aspects described above except for the length. In particular, the composition of the core member, additives in the core member, the density of the core member, the surface roughness of the core member, and the overall density of the rod-shaped intermediate product are the same as for the closures A and/or B of the present disclosure. As stated above, the length of the rod-shaped intermediate is a plurality of the desired length of the closure according to the disclosure. According to an aspect of the disclosure, the rod-shaped intermediate has a length of from 6 cm to 5000 cm, in particular from 8 cm to 200 cm, in particular from 30 cm to 180 cm, in particular from 50 cm to 170 cm, in particular from 60 cm to 160 cm, in particular from 70 to 150 cm, in particular from 80 to 140 cm, in particular from 90 cm to 130 cm.

The rod-shaped intermediate product, therefore, has been found to yield particularly efficient closures if the rod-shaped intermediate product comprises a plurality of cells. The properties of the plurality of cells are substantially the same as described above for the closures A and/or B according to the disclosure.

Although this provided for a highly efficient closure after cutting the rod-shaped intermediate product, it has been found to be even more effective, if the at least one peripheral layer of the rod-shaped intermediate product according to the disclosure is further defined as comprising a thickness ranging from 0.05 mm to 5 mm, in particular from 0.1 mm to 2 mm. For most efficient closures according to the disclosure, the properties of the at least one peripheral layer of the rod-shaped intermediate product are identical to the properties of the at least one peripheral layer of the closures A and/or B according to the disclosure as detailed above.

It has also been found that further additional additives may be incorporated into either the core member and/or the at least one peripheral layer of the synthetic closures A and/or B and/or the rod-shaped intermediate product according to the present disclosure in order to provide further enhancements and desirable performance characteristics. These additional additives incorporate antimicrobial agents, antibacterial compounds, and/or further oxygen scavenging materials. Suitable additives are known to the person skilled in the art. The antimicrobial and antibacterial additives can be incorporated into the closure to impart an additional degree of confidence that in the presence of a liquid the potential for microbial or bacterial growth is extremely remote. These additives have a long-term time release ability and further increase the shelf life without further treatments by those involved with the bottling of wine. Furthermore, it is possible for the cells of the closure to be substantially filled with a non-oxidizing gas, in order to further reduce oxygen ingress into the container. Ways of achieving this are known in the prior art.

According to an aspect of the disclosure, if desired, bonding agents or tie layers known to the skilled person can be employed on the outer surface of the core member in order to provide secure intimate bonded interengagement of the at least one peripheral layer therewith. If a tie layer is employed, the tie layer would effectively be interposed between the core member and the at least one peripheral layer to provide intimate bonded interengagement by effectively bonding the peripheral layer and the core member to the intermediately positioned tie layer. However, regardless of which process or bonding procedure is employed, all of these alternate embodiments are within the scope of the present disclosure. If more than one peripheral layer is present, such bonding agents or tie layers can similarly be employed between respective peripheral layers. This aspect applies equally to closure A, closure B, and the rod-shaped intermediate product.

In addition, in accordance with the teaching of the present disclosure, a unique manufacturing process is provided in which a completed multi-component synthetic closure and/or a rod-shaped intermediate product is achieved incorporating printed indicia formed thereon, in a continuous manufacturing operation.

In one embodiment (herein referred to as method A) the present disclosure provides for a method for producing multi-component closures comprising at least one thermoplastic polymer for being inserted and securely retained in a portal-forming neck of a container, said method comprises the steps of:

j. extruding a continuous, elongated substantially cylindrically shaped length of a material for forming the core member of the closure;

k. optionally, separately extruding one or several separate and independent layer(s) of plastic material in intimate bonded engagement with the continuous, elongated length of material forming the core member or, in the case of several independent layers, in intimate bonded engagement with the respective outermost independent layer formed on the continuous, elongated length of material, said separate and independent layer(s) of plastic material peripherally surrounding and substantially enveloping the cylindrical surface of the continuous, elongated length of material and forming a multi-component product;

l. passing the continuous, elongated, substantially cylindrically shaped length of material obtained in method step a. or in method step b. through a printer system for printing desired indicia on the lateral surface of said continuous, elongated length of material, m. separately extruding one or several separate and independent layer(s) of plastic material in intimate bonded engagement with the continuous, elongated length of material obtained in method step c. or, in the case of several independent layers, in intimate bonded engagement with the respective outermost independent layer formed on the continuous, elongated length of material, said separate and independent layer(s) of plastic material peripherally surrounding and substantially enveloping the cylindrical surface of the continuous, elongated length of material obtained in method step c. and being in overlying relationship with the indicia printed in method step c. and forming a multi-component product; and n. cutting the multi-component product obtained in method step d. in a plane substantially perpendicular to the central axis of the elongated length of material forming the core member, establishing a multi-component closure comprising at least one thermoplastic polymer and having the desired length for insertion and retention in the portal of the neck of the container, wherein said printing step comprises the use of invisible ink.

According to an aspect of the method of the present disclosure, the method further comprises the step of pretreating the outer surface of the elongated, continuous, length of material prior to passage of the elongated, continuous, length of material through the printer system. It has been found that the printing step is more efficient when the outer surface of the elongated, continuous, length of material is pretreated before the printing step. Preferably, said pretreatment is further defined as comprising one selected from the group consisting of heat treatment, corona treatment, flame treatment, plasma treatment, UV light exposure, and infrared heat exposure. These pretreatments have shown to effectively prepare the surface for a subsequent printing step.

In another embodiment (herein referred to as method B) the present disclosure provides for a method for producing multi-component closures comprising at least one thermoplastic polymer for being inserted and securely retained in a portal-forming neck of a container, said method comprises the steps of:

o. extruding a continuous, elongated substantially cylindrically shaped length of a material for forming the core member of the closure;

p. optionally, separately extruding one or several separate and independent layer(s) of plastic material in intimate bonded engagement with the continuous, elongated length of material forming the core member or, in the case of several independent layers, in intimate bonded engagement with the respective outermost independent layer formed on the continuous, elongated length of material, said separate and independent layer(s) of plastic material peripherally surrounding and substantially enveloping the cylindrical surface of the continuous, elongated length of material and forming a multi-component product;

q. passing the continuous, elongated, substantially cylindrically shaped length of material obtained in method step a. or in method step b. through a printer system for printing desired indicia on the lateral surface of said continuous, elongated length of material, r. separately extruding one or several separate and independent layer(s) of plastic material in intimate bonded engagement with the continuous, elongated length of material obtained in method step c. or, in the case of several independent layers, in intimate bonded engagement with the respective outermost independent layer formed on the continuous, elongated length of material, said separate and independent layer(s) of plastic material peripherally surrounding and substantially enveloping the cylindrical surface of the continuous, elongated length of material obtained in method step c. and being in overlying relationship with the indicia printed in method step c. and forming a multi-component product; and s. cutting the multi-component product obtained in method step d. in a plane substantially perpendicular to a central axis of the elongated length of material forming the core member, establishing a multi-component closure comprising at least one thermoplastic polymer and having the desired length for insertion and retention in the portal of the neck of the container, wherein the method further comprises the step of pretreating the outer surface of the elongated, continuous, length of material prior to passage of the elongated, continuous, length of material through the printer system. Preferably, the details of said pretreatment step are the same as described herein for method A.

According to a particular aspect of the method of the present disclosure, the ink used in the printing step comprises invisible ink. The use of invisible ink allows for a more efficient manufacture of multi-component closures, particularly in the cutting step.

The ink used in the printing step has been found to play an important role for manufacturing multi-component closures according to the disclosure. Solvent-based inks and/or UV-curable inks allow for an efficient manufacturing of the closures, as they provide sharp indicia. Therefore, according to a further aspect of method A and/or method B of the present disclosure, a solvent-based ink is used in the printing step. According to another aspect of method A and/or method B of the present disclosure, a UV-curable ink is used in the printing step.

In another embodiment (herein referred to as method C), the present disclosure provides for a method for producing multi-component closures comprising at least one thermoplastic polymer for being inserted and securely retained in a portal-forming neck of a container, said method comprises the steps of:

t. extruding a continuous, elongated substantially cylindrically shaped length of a material for forming the core member of the closure;

u. optionally, separately extruding one or several separate and independent layer(s) of plastic material in intimate bonded engagement with the continuous, elongated length of material forming the core member or, in the case of several independent layers, in intimate bonded engagement with the respective outermost independent layer formed on the continuous, elongated length of material, said separate and independent layer(s) of plastic material peripherally surrounding and substantially enveloping the cylindrical surface of the continuous, elongated length of material and forming a multi-component product;

v. passing the continuous, elongated, substantially cylindrically shaped length of material obtained in method step a. or in method step b. through a printer system for printing desired indicia on the lateral surface of said continuous, elongated length of material, w. separately extruding one or several separate and independent layer(s) of plastic material in intimate bonded engagement with the continuous, elongated length of material obtained in method step c. or, in the case of several independent layers, in intimate bonded engagement with the respective outermost independent layer formed on the continuous, elongated length of material, said separate and independent layer(s) of plastic material peripherally surrounding and substantially enveloping the cylindrical surface of the continuous, elongated length of material obtained in method step c. and being in overlying relationship with the indicia printed in method step c. and forming a multi-component product; and x. cutting the multi-component product obtained in method step d. in a plane substantially perpendicular to the central axis of the elongated length of material forming the core member, establishing a multi-component closure comprising at least one thermoplastic polymer and having the desired length for insertion and retention in the portal of the neck of the container, wherein said printing step comprises the use of a solvent-based ink. Preferably, method C further comprises the step of pretreating the outer surface of the elongated, continuous, length of material prior to passage of the elongated, continuous, length of material through the printer system. More preferably, the details of said pretreatment step are the same as described herein for method A and/or method B. Most preferably, the ink used in the printing step according to this embodiment comprises invisible ink.

In another embodiment (herein referred to as method D), the present disclosure provides for a method for producing a rod-shaped intermediate product for the preparation of a plurality of multi-component closures for being inserted and securely retained in a portal-forming neck of a container, said rod-shaped intermediate product comprising at least one thermoplastic polymer, and said method comprising the steps of:

y. extruding a continuous, elongated substantially cylindrically shaped length of a material for forming the core member of the rod-shaped intermediate product;

z. optionally, separately extruding one or several separate and independent layer(s) of plastic material in intimate bonded engagement with the continuous, elongated length of material forming the core member or, in the case of several independent layers, in intimate bonded engagement with the respective outermost independent layer formed on the continuous, elongated length of material, said separate and independent layer(s) of plastic material peripherally surrounding and substantially enveloping the cylindrical surface of the continuous, elongated length of material and forming a multi-component product;

aa. passing the continuous, elongated, substantially cylindrically shaped length of material obtained in method step a. or in method step b. through a printer system for printing desired indicia on the lateral surface of said continuous, elongated length of material, bb. separately extruding one or several separate and independent layer(s) of plastic material in intimate bonded engagement with the continuous, elongated length of material obtained in method step c. or, in the case of several independent layers, in intimate bonded engagement with the respective outermost independent layer formed on the continuous, elongated length of material, said separate and independent layer(s) of plastic material peripherally surrounding and substantially enveloping the cylindrical surface of the continuous, elongated length of material obtained in method step c. and being in overlying relationship with the indicia printed in method step c. and forming a multi-component product; and cc. cutting the multi-component product obtained in method step d. in a plane substantially perpendicular to the central axis of the elongated length of material forming the core member, establishing a multi-component rod-shaped intermediate product comprising at least one thermoplastic polymer and having a multiple of the desired length of the closure, wherein said rod-shaped intermediate product is capable of being cut into closures having the desired length for insertion and retention in the portal of the neck of the container. Preferably, the ink used in the printing step comprises invisible ink. The use of invisible ink has been found to help establish efficient manufacturing of multi-component rod-shaped intermediate products, particularly in the cutting step.

The ink used in the printing step for producing rod-shaped intermediate products has been found to play an important role for manufacturing multi-component rod-shaped intermediate products according to the disclosure. Solvent-based inks and/or UV-curable inks can be helpful for an efficient manufacturing of the rod-shaped intermediate products, as they provide sharp indicia. Therefore, according to a further aspect of method D of the present disclosure, a solvent-based ink is used in the printing step. According to another aspect of method D of the present disclosure, a UV-curable ink is used in the printing step.

dd. According to an aspect of method D of the present disclosure, said method further comprises extruding a continuous, elongated substantially cylindrically shaped length of a material for forming the core member of the closure or the rod-shaped intermediate product;

ee. optionally, separately extruding one or several separate and independent layer(s) of plastic material in intimate bonded engagement with the continuous, elongated length of material forming the core member or, in the case of several independent layers, in intimate bonded engagement with the respective outermost independent layer formed on the continuous, elongated length of material, said separate and independent layer(s) of plastic material peripherally surrounding and substantially enveloping the cylindrical surface of the continuous, elongated length of material and forming a multi-component product;

ff. optionally, passing the continuous, elongated, substantially cylindrically shaped length of material obtained in method step a. or in method step b. through a printer system for printing desired indicia on the lateral surface of said continuous, elongated length of material, gg. separately extruding one or several separate and independent layer(s) of plastic material in intimate bonded engagement with the continuous, elongated length of material obtained in method step c. or, in the case of several independent layers, in intimate bonded engagement with the respective outermost independent layer formed on the continuous, elongated length of material, said separate and independent layer(s) of plastic material peripherally surrounding and substantially enveloping the cylindrical surface of the continuous, elongated length of material obtained in method step c. and being in overlying relationship with the indicia printed in method step c. and forming a multi-component product;

hh. passing the continuous, elongated, substantially cylindrically shaped length of material obtained in method step d. through a printer system for printing desired indicia on the lateral surface of said continuous, elongated length of material, and ii. cutting the multi-component product obtained in method step e. in a plane substantially perpendicular to the central axis of the elongated length of material forming the core member, establishing a multi-component closure or rod-shaped intermediate product comprising at least one thermoplastic polymer, wherein optional printing step c. comprises the use of visible ink and printing step e. comprises the use of invisible ink.

the step of pretreating the outer surface of the elongated, continuous, length of material prior to passage of the elongated, continuous, length of material through the printer system. It has been found that the printing step is more efficient when the outer surface of the elongated, continuous, length of material is pretreated before the printing step. Preferably, said pretreatment is further defined as comprising one selected from the group consisting of corona treatment, flame treatment, plasma treatment, UV light exposure, and infrared heat exposure. These pretreatments can help to effectively prepare the surface for a subsequent printing step.

In another embodiment (herein referred to as method E), the present disclosure provides for a method for producing multi-component closures or rod-shaped intermediate products comprising at least one thermoplastic polymer, said method comprises the steps of:

The following aspects apply equally to methods A, B, C, D, and E.

In the printing step(s), any desired indicia, graphics, symbols, codes and the like can be printed onto the lateral surface of the continuous, elongated length of material passed through said printer system while the product is being continuously extruded.

According to an aspect of the method of the present disclosure, by separately forming one or several outer layer(s) around the continuous, elongated length of material obtained in method step c., that is, after the printing step c., protection of the indicia printed in step c. is provided, thereby reducing or eliminating any possibility of ink transfer or smearing after formation of the outer layer. Since the material employed for the outer layer(s) in overlying relationship with the printed indicia is selected for its visual transparency, the printed indicia formed in method step c. are easily visible and/or detectable.

According to an aspect of the method of the present disclosure, the method further comprises the step of passing the continuous, elongated, substantially cylindrically shaped length of material obtained in method step d. through a printer system for printing desired indicia comprising invisible ink on the lateral surface of said continuous length of material after step d.

For the application of one or several additional layer(s) on top of the surface that comprises the indicia after the printing step c., it has been found to be advantageous if the outer surface of the elongated, continuous, length of material is post treated after the printing step. Therefore, according to an aspect of the method of the present disclosure, said method further comprises the step of post treating the outer surface of the elongated, continuous, length of material after passage of the elongated length of material through the printer system in printing step c. Preferably, said post treatment is further defined as comprising one selected from the group consisting of corona treatment, flame treatment, plasma treatment, UV light exposure, heat treatment, and infrared heat exposure. Preferably, the post treatment comprises heating the elongated length of material to a certain temperature. A post treatment can help to effectively prepare the surface for a subsequent application of one or several additional layer(s) on top of the surface that comprises the indicia after the printing step. If desired, such a post treatment can be applied after any printing step.

According to an aspect of the method according to the disclosure, the continuous, elongated length of material is subjected to a heat treatment in which the continuous, elongated length of material is heated to a temperature from 30 to 180° C. before and/or after the printing step. Said heat treatment can be applied before and/or after any printing step of the method according to the disclosure. It has been found advantageous if the continuous, elongated length of material itself attains a temperature of from 30 to 180° C. Therefore, the temperature of the heating means, for example an oven or an infrared heat source, need to be adjusted accordingly.

According to an aspect of the method of the present disclosure, the method further comprises the step of pretreating the outer surface of the multi-component elongated length of material before the cutting step. This can aid in achieving desired surface properties of the final closure. Preferably, said pretreatment step is further defined as comprising one selected from the group consisting of corona treatment, flame treatment, plasma treatment, UV light exposure, heat treatment, and infrared heat exposure.

According to another aspect of the method of the present disclosure, the indicia are printed using invisible and visible ink. In this way, closures and rod-shaped intermediate products with indicia that comprise information visible under normal lighting and/or temperature conditions and additional information invisible under normal lighting and/or temperature conditions can be prepared.

According to an aspect of the method of the present disclosure, the indicia are printed using a solvent-based ink and a UV-curable ink.

According to a further aspect of the method of the present disclosure, the indicia are printed repeatedly at regular intervals. The size of the intervals is chosen such that it comprises the required distance for enabling individual synthetic closures to be formed from the elongated length of material when the material is cut in the desired lengths. Each printed indicia represents the designation or information desired for each individual synthetic closure.

According to an aspect of the methods of the present disclosure, at least a registration mark is printed in the printing step. If the method comprises more than one printing step, said registration mark can be printed in any of these printing steps. Such a registration mark can help to define a cutting position in the cutting step of the method of the present disclosure. Preferably, the registration mark comprises invisible ink. More preferably, the registration mark consists of invisible ink. It has been found that using invisible ink for the registration mark can provide more flexibility for other indicia printed in method step c., particularly for indicia printed with visible ink. Moreover, the use of invisible ink for the registration mark can help to avoid miscutting in the cutting step. If the cutting is exclusively triggered by indicia printed with invisible ink, the probability of a mistrigger by indicia printed with visible ink is reduced. Therefore, according to another aspect of the method of the present disclosure, the registration mark is detected by the cutting machine in method step e. In another aspect of the method of the present disclosure, the registration mark is used for determining the cutting position in the cutting machine in method step e.

Although this provided for an efficient process for preparing closures and/or rod-shaped intermediate products according to the disclosure, it has been found to be helpful when the indicia printed with visible ink can be detected in the cutting machine in the cutting step. Therefore, according to a further aspect of the method of the present disclosure, the indicia printed with visible ink are detected in the cutting machine in method step e. Preferably, the indicia printed with visible ink and/or invisible ink are used to readjust the cutting position. In this way, the cutting position in the cutting step. can be effectively adjusted and/or maintained at the desired position.

In another aspect of the method of the present disclosure, the method comprises the additional step of providing continuous movement of the elongated, substantially, cylindrically-shaped length of material through the production steps. Preferably, said continuous movement is provided by passing the cylindrically shaped length of material through a puller assembly.

The invisible ink employed in the printing step can be detected and/or visibilized in different ways. According to an aspect of the method of the disclosure, the method to visibilize and/or detect the invisible ink is defined as comprising one selected from the group consisting of illuminating with UV light, illuminating with infrared light, irradiating with radiation from an x-ray source, irradiating with radiation from a radio frequency source, heat treatment, cooling, in particular cooling to below about 8° C., in particular cooling to a temperature from −40° C. to 8° C., and a chemical reaction of the ink with a chemical reagent. Preferably, the invisible ink is visibilized and/or detected by illuminating with UV light and/or illuminating with infrared light.

According to an aspect of the method of the present disclosure, the material for forming the core member contains at least one thermoplastic polymer. The details regarding the at least one thermoplastic polymer in the core member are the same as the details for the thermoplastic polymers described herein for the core member of the closures A and/or B and/or the rod-shaped intermediate product of the present disclosure. If a combination of polymers is used, the core member provided in method step a. comprises this combination.

According to a further aspect of the method of the present disclosure, the material for each separate and independent layer of plastic material peripherally surrounding and substantially enveloping the cylindrical surface of the continuous, elongated length of material contains at least one thermoplastic polymer. The details regarding the at least one thermoplastic polymer in the peripheral layer are the same as the details regarding suitable materials, compounds and compositions described herein with respect to the at least one peripheral layer of the closures A and/or B and/or the rod-shaped intermediate product of the present disclosure.

All details disclosed herein for the closures A and/or B and/or for the rod-shaped intermediate according to the present disclosure are also relevant for the embodiments of the method according to the present disclosure and therefore also apply to the methods A, B, C, D, and E disclosed herein.

By achieving a multi-component synthetic bottle closure in accordance with the present disclosure, a bottle closure is realized which is capable of satisfying some or all requirements imposed thereon by the wine industry, as well as substantially any other bottle closure/packaging industry. As a result, a synthetic bottle closure is attained that can be employed for completely sealing and closing substantially any desired bottle for securely and safely storing the product retained therein, with almost any desired markings and/or indicia printed thereon.

The disclosure accordingly comprises articles of manufacture possessing the features, properties, and relation of elements which will be exemplified in the article hereinafter described, and the scope of the disclosure will be indicated in the claims.

BRIEF DESCRIPTION OF THE FIGURES

For a fuller understanding of the nature and objects of the disclosure herein described, reference is made to the following detailed description taken in connection with the accompanying drawings, in which:

FIG. 1 is a perspective view of the synthetic closure produced by employing the manufacturing system of the present disclosure;

FIG. 2 is a diagrammatic view of the manufacturing equipment employed for producing the synthetic closure of the present disclosure using the preferred manufacturing method of the disclosure;

DETAILED DESCRIPTION

Figure 3:
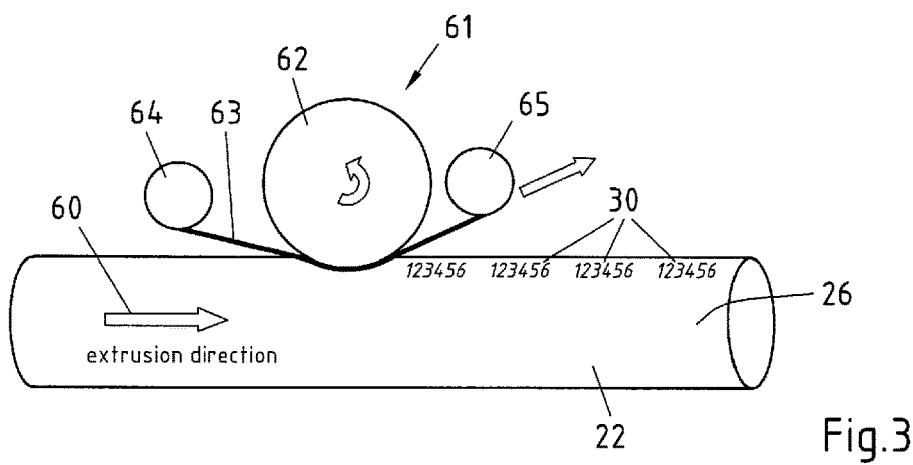
FIGS. 3-7 are a series of diagrammatic views depicting alternate printing techniques and systems that may be employed in implementing the present disclosure.

By referring to FIGS. 1-7, along with the following detailed disclosure, the construction and production method for the multi-component synthetic bottle closures of the present disclosure can best be understood. In these Figures, as well as in the following detailed disclosure, an exemplary embodiment of the multi-component synthetic closure of the present disclosure, and its method of production, is depicted and discussed as a bottle closure for wine products. However, as detailed above, the present disclosure is applicable as a synthetic closure for use in sealing and retaining any desired product in any desired closure system. However, due to the stringent and difficult demands and requirements placed upon closures for wine products, the following detailed disclosure focuses upon the applicability of the synthetic bottle closures of the present disclosure as a closure for wine bottles. However, it is to be understood that this detailed discussion is provided merely for exemplary purposes and is not intended to limit the present disclosure to this particular application and embodiment.

In FIG. 1, the preferred construction of multi-component synthetic closure 20 is depicted comprising a generally cylindrical shape formed by core member 22 with flat surfaces 27 and outer layer or skin layer 24 which peripherally surrounds and is intimately bonded to core member 22.

In the preferred embodiment, outer layer or skin layer 24 is intimately bonded directly to core member 22, peripherally surrounding and enveloping the substantially cylindrically shaped surface of core member 22. Outer layer or skin layer 24 incorporates exposed surface 29, which comprises a substantially cylindrical shape and forms the outer surface of multi-component synthetic bottle closure 20 of the present disclosure, along with flat end surfaces 27 that are devoid of outer layer or skin layer 24.

In addition, as is more fully detailed below, core member 22 incorporates printed indicia 30 formed on the substantially cylindrically shaped outer surface thereof which is placed thereon prior to the formation of outer layer or skin layer 24 on the substantially cylindrically shaped surface of core member 22. In this way, outer layer or skin layer 24 overlies and protects printed indicia 30 placed on the substantially cylindrically shaped surface of core member 22. Furthermore, in accordance with the present disclosure, indicia 30 comprises any desired printed material, graphics, numbers, symbols, codes, designations, data matrix codes, linear bar-codes, generic printed patterns, custom printed patterns, traceability numbers, labels, generic artwork, specific artwork, invisible marks, covert marks, registration marks, and the like. These indicia can be printed with ink that is visible under normal lighting and/or temperature conditions and/or with ink that is invisible under normal lighting and/or temperature conditions.

As briefly discussed above, outer layer or skin layer 24 must be constructed from material which provides sufficient transparency for enabling indicia 30 printed on core member 22 to be easily visible and/or detectable therethrough. In addition to selecting materials which will provide the desired transparency, the thickness of outer layers/skin layer 24 is also controlled in order to assure the visibility and/or detectability of indicia 30 through outer layer/skin layer 24.

By referring to FIG. 2, along with the following detailed discussion, the preferred production method of the present disclosure wherein multi-component
synthetic bottle closure 20 is formed, with the desired indicia printed thereon during the forming operation. In accordance with this disclosure, the first production step or stage is the use of extruder 35.

In order to employ extruder 35, the desired materials or ingredients are fed into hopper 36 for being processed through extruder 35 to produce core member 22 as a continuous, elongated length of material. Typically, core member 22 is foamed during processing through extruder 35. Preferably, a physical blowing agent such as carbon dioxide rather is employed for foaming the core member. However, foam material is not required for forming core member 22.

As core member 22 emerges from extruder 35 as a continuous, elongated length of material, core member 22 passes through water bath 40 for controlling the temperature of core member 22. In addition, the temperature of the continuous elongated length of material can be controlled using a calibrator station. In the calibrator station, the temperature of the continuous elongated length of material is controlled by blowing cold air onto the elongated length of material and/or by passing it along cooled steel segments. The calibrator station can be positioned before or after water bath 40. After core member 22 emerges from water bath 40, core member 22 passes through in-line printing station 44. In accordance with the present disclosure, printing station 44 may comprise any desired construction which achieves effective printing, marking, labeling, and/or decorating on the surface of core member 22. Although not all inclusive, such printing systems include one or more selected from the group consisting of dry offset printers, inkjet printers, hot stamping printers, laser printers, laser marking, hot melt ink jet printing, engraving, offset printing, dry offset printing, direct gravure printing, tampon printing, and the like. In addition, if desired, pretreatment of the surface of core member 22 can be provided and would typically include heat treatment, corona treatment, flame treatment, plasma treatment, and/or UV treatment. Furthermore, print curing may also be provided using such means as UV light exposure and/or infrared heat exposure.

According to the preferred embodiment, an inkjet printing system utilizing a curable ink such as a UV-curable ink or a heat dryable ink such as a solvent-based ink may be employed. Furthermore, invisible and/or visible ink may be used. The visibility and/or detectability of the ink refers to the visibility/detectability under normal lighting and/or temperature conditions. Ink curing and/or drying may be provided by using such means as UV light exposure and/or infrared heat exposure after passage of the elongated length of material through the printer system. In addition, if desired, the outer surface of the elongated, continuous, length of material forming the core member after passage of the elongated length of material through the printer system and/or curing system can be post treated. Post treatment would typically include heat treatment, corona treatment, flame treatment, plasma treatment and/or UV treatment. The post treatment of the printed elongated, continuous length of material forming the core member is preferably effected prior to applying the peripheral layer.

While in FIG. 2 the printing station 44 is located immediately after the water bath 40, it is also possible to place the printing station 44 at other positions in the production line, e.g. after the extruder 35 and/or before or after puller 42. However, it has been found that the placement of the printing station 44 after the water bath 40 can yield closures and/or rod-shaped intermediate products with the desired properties. It has been found in particular that the placement of the printing station 44 after the water bath 40 can yield sharply printed indicia on the closures and or rod-shaped intermediate products. This may be due to the fact that the indicia are not distorted by a shrinking of the core member on cooling. Moreover, it has been found that irregularities in the skin that can lead to leakage of the wine from the bottle after corking using the closure can be avoided when placing the printing station 44 after the water bath 40.

As is evident from the foregoing discussion as well as the further detailed disclosure provided herein, the printing of any desired indicia on the surface of core member 22 while core member 22 is being manufactured and processed as a continuous, elongated length of material represents a significant advantage for achieving a high-speed, low cost, labor-free or labor-reduced production operation. In particular, the pretreatment of core member 22 before printing and/or the post treatment after the printing help in achieving indicia that are not smeared. In this regard, a solvent-based ink can help to achieve a more efficient manufacturing process. As a result, by employing the manufacturing process of the present disclosure, multi-component synthetic closures are produced substantially more efficiently, effectively, and less expensively than prior art constructions.

As shown in FIG. 2, the continuous, elongated length of material forming core member 22 is advanced through the stages of the production operation by employing puller 42. Typically, puller 42 comprises a pair of continuously rotating endless loop belt members mounted in cooperating, spaced relationship with each other for enabling the continuous length of material forming core member 22 to pass therebetween and be continuously advanced by the movement of the belt members. In this way, core member 22 continuously moves at a controlled rate of speed through the entire production operation.

After passage of core member 22 through printing station 44, core member 22 passes through puller 42 and is advanced from there into extruder 46 for applying the outer layer or skin layer 24 about the substantially cylindrically shaped surface 26 of core member 22.

Typically, extruder 46 comprises a crosshead extrusion system or a co-extrusion system for providing the desired outer layer or skin layer 24 to core member 22. In this application, the terms "crosshead extrusion" and "co-extrusion" are used interchangeably as equivalent terms. As a result, regardless of the system employed, whether these systems or any other system, the present disclosure focuses upon the application of outer layer/skin layer 24 on the substantially cylindrically shaped surface of core member 22 after the desired indicia has been printed on the substantially cylindrically shaped surface of core member 22.

Typically, extruder 46 operates in a manner similar to extruder 35 by having the desired material fed into hopper 47 which is then processed and passed through extruder 46 for delivering and applying the desired outer layer/skin layer 24 to core member 22. In this regard, using the equipment detailed above and well known in the industry, extruder 46 is able to apply a controlled, thin layer of material intimately bonded to core member 22 in peripheral, surrounding interengagement therewith, thereby achieving the desired outer layer 24 with the desired physical characteristics. In addition, by incorporating material which achieves sufficient transparency, the indicia printed on core member 22 is readily visible and/or detectable through outer layer/skin layer 24.

Once outer layer/skin layer 24 has been applied to core member 22, the resulting product is fed to water bath 50 for controlling the temperature of the multi-component product. The movement of the elongated length of material comprising core member 22 and outer layer/skin layer 24 continues through water bath 50 and through the final stages of the operation. This continued movement is provided by puller assembly 43.

In this final stage, the elongated length of material comprising core member 22 and outer layer/skin layer 24 is fed through cutting blade members 52 which repeatedly cut the elongated length of material into the desired length for producing synthetic closure 20. If desired, the outer surface of the continuous, elongated, multi-component length of material can be pretreated before the cutting operation. The pretreatment can include heat treatment, corona treatment, flame treatment, plasma treatment and/or UV treatment. A suitable pretreatment station can be placed before or after puller assembly 43. In the cutting operation, a visible or invisible registration mark printed onto the elongated length of material of core member 22 in the printing step is detected by the cutting machine to determine the cutting position. Moreover, the cutting position can be readjusted by recognizing the position of the indicia on the elongated length of material comprising core member 22 and outer layer/skin layer 24. Thus, from the cutting blade member 52, closure 20 with the desired length is formed. If desired, a lubrication of the closures can be provided after the cutting step by applying a lubricant such as silicone oil to the closure. This can be effected, for example, by tumbling at least one closure with the lubricant.

In an alternate embodiment, the elongated length of material is cut into rod-shaped intermediate products with the length of a plurality of the length of a synthetic closure. Typically, this can be achieved by adjusting the cutting machine to cut after detecting a predefined number of registration marks on the elongated length of material. Alternatively, the cutting machine can be set to cut after predefined time intervals. Thus, in this alternate embodiment, the rod-shaped intermediate product is formed from the cutting blade members 52. From the rod-shaped intermediate products, the individual closures 20 can be formed by passing the rod-shaped intermediate product through the cutting blade members 52 that cut the rod-shaped intermediate product into the desired length of the closures. In this cutting operation, a visible or invisible registration mark printed onto the elongated length of material of the core member 22 of the rod-shaped intermediate product in the printing step can be detected by the cutting machine to determine the cutting position. The rod-shaped intermediate product can comprise one or more registration marks. If there is more than one registration mark, the registration marks on the core member 22 of the rod-shaped intermediate product can be comprised at regular intervals corresponding to the size of the final closures. Moreover, the cutting position can be readjusted by recognizing the position of the indicia on the rod-shaped intermediate product. Thus, individual closures 20 are formed from the rod-shaped intermediate product in this cutting operation. If desired, a lubrication of the closures can be provided after the cutting step by applying a lubricant such as silicone oil to the closure. This can be effected, for example, by tumbling at least one closure with the lubricant. Furthermore, if desired, the outer surface of the rod-shaped intermediate product can be pretreated before the cutting operation. The pretreatment can include heat treatment, corona treatment, flame treatment, plasma treatment and/or UV treatment.

As is evident from the foregoing detailed disclosure, the production system of the present disclosure is capable of providing a completed synthetic closure 20 and/or a rod-shaped intermediate product in a continuous, in-line operation with virtually no manual intervention. By employing this disclosure, the entire system operates automatically, producing synthetic closure 20 and/or a rod-shaped intermediate product having core member 22 which is peripherally surrounded and intimately bonded to outer layer/skin layer 24 with any desired indicia 30 printed on the surface of core member 22 prior to the application of outer layer/skin layer 24. The cutting operation is improved by employing indicia that are invisible under normal lighting and/or temperature conditions but can be detected in the cutting operation. An ink that is detectable and/or visible when illuminated with UV light is particularly useful in this regard. Moreover, the cutting position can be readjusted using the indicia printed on core member 22. In this way, the present disclosure eliminates some or all of the difficulties and drawbacks found in prior art synthetic closure systems, wherein printing is required to be achieved on individual closure members after their production or the cutting of the continuous length of material comprising indicia is problematic.

By referring to FIGS. 3-7, along with the following detailed discussion, the preferred printing techniques or operations for forming any desired indicia on the surface of core member 22 can best be understood. However, it should also be understood that the following discussion as well as the embodiments shown in FIGS. 3-7 are shown for exemplary purposes only and are not intended as a limitation of the present disclosure to the particular techniques or operations disclosed herein.

In FIG. 3, an in-line foil or ribbon printing system is depicted wherein the elongated length of material forming core member 22 is advanced in the direction represented by arrow 60 through printing assembly 61. In this regard, printing assembly 61 comprises printhead 62, print ribbon 63 and transfer spools 64 and 65. In this embodiment, printing ribbon 63 is transferred from spool 64 to spool 65 for continuously advancing ribbon 63 in the desired direction.

In addition, printhead 62 continuously rotates about its central axis and incorporates the desired indicia formed on rotating printhead 62. As core member 22 advances into contact with printhead 62 as ribbon 63 passes therebetween, the indicia contained on printhead 62 is imparted to the substantially cylindrically shaped surface 26 of core member 22, as depicted in FIG. 3. In this way, the desired indicia 30 is continuously printed upon the surface of core member 22 as core member 22 continuously advances in the direction of the arrow 60.

As discussed above, indicia 30 may comprise any desired printed material including data matrix codes, linear bar codes, generic print patterns, custom print patterns, logos, artwork, symbols, traceability numbers, registration marks, invisible marks, and the like. For exemplary purposes, a number sequence is depicted as indicia 30 in FIGS. 3-6.

In addition to depicting various alternate methods for printing a number sequence during the in-line extrusion process in accordance with the present disclosure, the following detailed disclosure also describes a method for improving the cutting operation, wherein the desired positioning of indicia on individual synthetic closures formed from the elongated length of material is provided by a registration mark. In addition, as is evident from the foregoing detailed disclosure, any desired art work may also be printed on the synthetic closures manufactured in accordance with the present disclosure, along with any registration mark.

Figure 4:
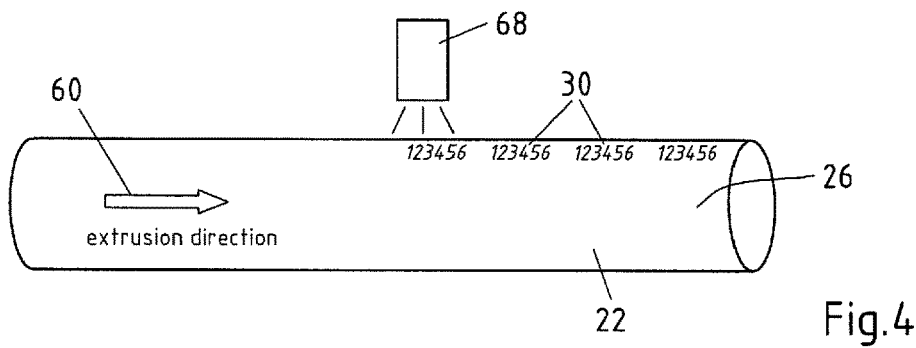
Figure 5:
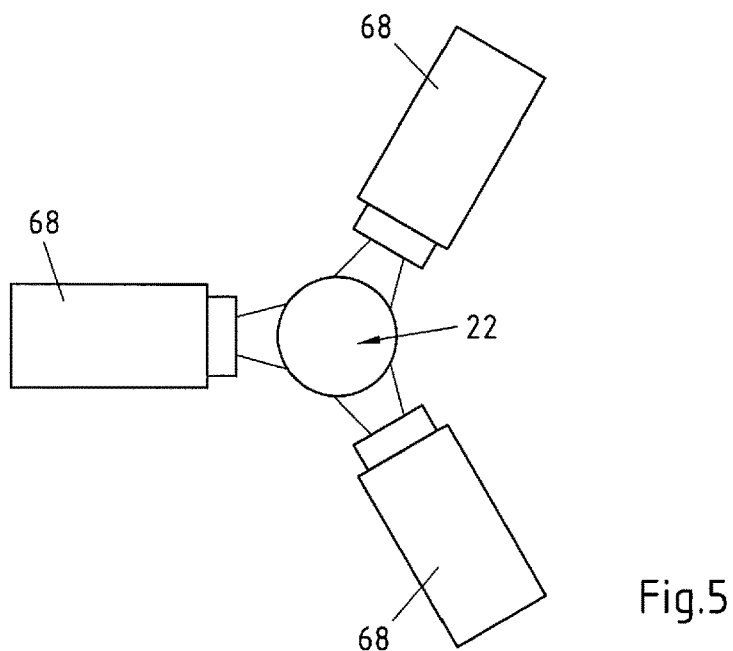

In FIGS. 4 and 5, an in-line inkjet, in-line laser marking, or in-line hot melt printing operation is depicted. As shown, one or more ink jet printing heads, laser marking heads, or hot melt printing heads 68 are positioned in association with the continuous length of material forming core member 22 for printing the desired indicia 30 on the surface of core member 22 as core member 22 advances in direction 60. As shown, a single printhead 68 or a plurality of printheads 68 can be employed for achieving the desired printing of indicia 30 on the surface of core member 22.

Figure 6:
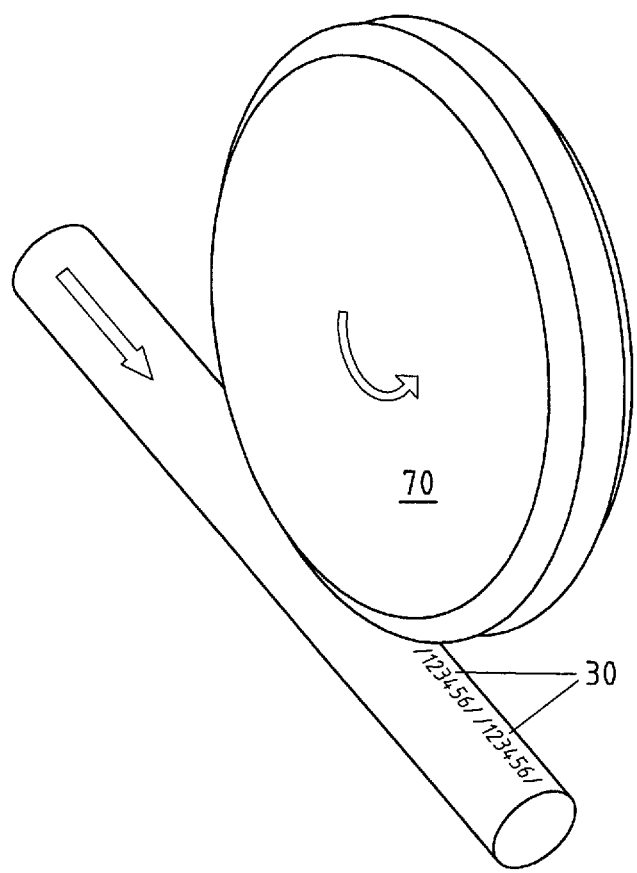

In FIG. 6, an alternate printing method is depicted wherein indicia 30 is printed on the outer surface of core member 22 by employing rotating print wheel 70. As depicted, print wheel 70 incorporates the desired indicia formed on the outer edge thereof and is constructed for having ink applied to this outer surface for effectively printing the desired indicia 30 on the surface of core member 22 as core member 22 advances into contact with the outer edge of rotating wheel 70. In this way, the desired indicia 30 is quickly and easily effectively printed on the outer surface of core member 22 as core member 22 continues to move through the manufacturing operation detailed above.

Figure 7:
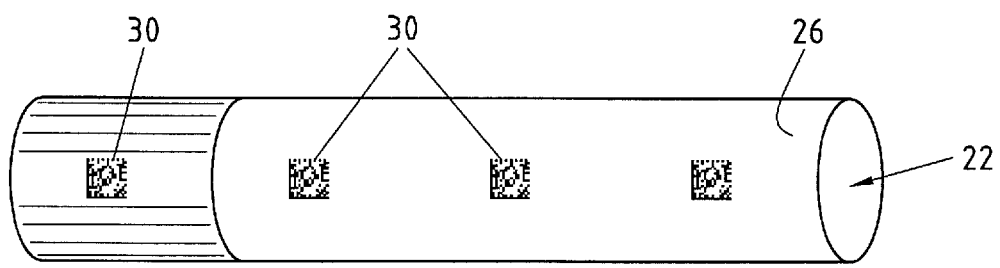

Finally, FIG. 7 shows how the precise position of registry of indicia 30 on closure 20 can be achieved. Indicia 30 is depicted as comprising data matrix codes printed on core member 22 repeatedly at regular intervals using any of the printing techniques detailed above. The length of the final closure 20 is indicated, as well. In this regard, the data matrix code may serve as a start/stop signal and/or eye mark and/or registration mark printed on the surface of core member 22. Vision control systems or vision algorithms can be employed, which detect such a registration mark such that the desired positioning of the indicia on the final closure is achieved. Printing these specific signals and/or marks using invisible ink can help to avoid a confusion of the desired indicia with the signals and/or marks. If desired, the indicia printed using visible ink can be detected by a vision control system or vision algorithm, too, to allow for readjustment of the cutting position.

Although FIG. 7 depicts only data matrix codes, it is evident from the foregoing detailed discussion that indicia 30 may comprise any configuration or visual appearance which may be desired including indicia invisible under normal lighting and/or temperature conditions and/or indicia visible under normal lighting and/or temperature conditions.

It will thus be seen that the needs set forth above, among those made apparent from the preceding description, are efficiently obtained and, since certain changes may be made in carrying out the above method without departing from the scope of this disclosure, it is intended that all matter contained in the above description or shown in the accompanying drawings shall be interpreted as illustrative and not in a limiting sense. Furthermore, it should be understood that the details of the disclosure described in the foregoing detailed description are not limited to the specific embodiments shown in the drawings but are rather meant to apply to the disclosure in general as outlined in the summary of the disclosure and in the claims.

It is also to be understood that the following claims are intended to cover all of the generic and specific features of the disclosure herein described, and all statements of the scope of the disclosure which, as a matter of language, might be said to fall there between.

We claim:

1. A multi-component, substantially cylindrical closure for being inserted and securely retained in a portal-forming neck of a container, the closure comprising:
   a. a core member comprising at least one thermoplastic polymer,
   b. at least one peripheral layer at least partially surrounding and intimately bonded to the core member, the at least one peripheral layer comprising at least one thermoplastic polymer, and
   c. printed indicia printed on a lateral surface of the core member or on a lateral surface of the at least one peripheral layer, wherein the printed indicia comprise invisible ink, and
   d. at least one of the following features (i) to (iii):
      (i) the printed indicia comprise a registration mark comprising the invisible ink and defining a cutting position configured to be detected by a cutting machine, the printed indicia further comprising decorative indicia that differ from the registration mark, that comprise visible ink, and that are non-interfering with the registration mark;
      (ii) the invisible ink is detectable by a change in temperature from a temperature within a range of from 10° C. to 35° C. to a temperature within a high range of from 40° C. to 200° C., without requiring presence of infrared or ultraviolet light; or
      (iii) the invisible ink is rendered visually detectable by irradiation with emissions of a radio frequency source.

2. The closure according to claim 1, wherein the printed indicia comprise a solvent-based ink.

3. The closure according to claim 1, wherein the printed indicia comprise a UV-curable ink.

4. The closure according to claim 1, wherein the at least one peripheral layer comprises a first peripheral layer at least partially surrounding and intimately bonded to the core member, the first peripheral layer comprising at least one thermoplastic polymer, and at least one second peripheral layer at least partially surrounding and intimately bonded to the first peripheral layer, the at least one second peripheral layer comprising at least one thermoplastic polymer, wherein the printed indicia are printed on a lateral surface of the first peripheral layer and wherein the at least one second peripheral layer overlies the printed indicia.

5. The closure according to claim 4, wherein the printed indicia comprise a registration mark comprising the invisible ink and defining a cutting position configured to be detected by a cutting machine, the printed indicia further comprising decorative indicia that differ from the registration mark, that comprise visible ink, and that are non-interfering with the registration mark.

6. The closure according to claim 1, wherein the printed indicia comprise visible ink.

7. The closure according to claim 1, wherein the invisible ink is detectable by a change in temperature from a temperature within a range of from 10° C. to 35° C. to a temperature within a high range of from 40° C. to 200° C., without requiring presence of infrared or ultraviolet light.

8. The closure according to claim 1, wherein the invisible ink is detectable under ultraviolet light.

9. The closure according to claim 1, wherein the invisible ink is detectable under infrared light.

10. The closure according to claim 1, wherein the invisible ink is invisible from 10 to 35° C. and visible at temperatures in a range of from 40 to 200° C.

11. The closure according to claim 1, wherein the invisible ink is invisible from 10 to 35° C. and visible at temperatures below about 8° C.

12. The closure according to claim 1, wherein the invisible ink is detectable by a chemical reaction of the invisible ink upon exposure of the invisible ink to iodine or a pH indicator.

13. The closure according to claim 1, wherein the invisible ink is detectable by irradiation with emissions of an x-ray source.

14. The closure according to claim 1, wherein the invisible ink is rendered visually detectable by irradiation with emissions of a radio frequency source.

15. The closure according to claim 1, wherein the printed indicia are printed on a surface having a surface roughness $R_a$ in a range of from 0.5 µm to 17 µm.

16. The closure according to claim 1, wherein the at least one thermoplastic polymer of the core member is selected from the group consisting of polyethylenes, metallocene catalyst polyethylenes, polybutanes, polybutylenes, polyurethanes, silicones, vinyl-based resins, thermoplastic elastomers, polyesters, ethylenic acrylic copolymers, ethylene-vinyl-acetate copolymers, ethylene-methyl-acrylate copolymers, thermoplastic polyurethanes, thermoplastic olefins, thermoplastic vulcanizates, flexible polyolefins, fluorelastomers, fluoropolymers, polytetrafluoroethylenes, and blends thereof, ethylene-butyl-acrylate copolymers, ethylene-propylene-rubber, styrene butadiene rubber, styrene butadiene block copolymers, ethylene-ethyl-acrylic copolymers, ionomers, polypropylenes, and copolymers of polypropylene and copolymerizable ethylenically unsaturated comonomers, olefin copolymers, olefin block copolymers, styrene ethylene butadiene styrene block copolymers, styrene ethylene butylene styrene block copolymers, styrene ethylene butylene block copolymers, styrene butadiene styrene block copolymers, styrene butadiene block copolymers, styrene isoprene styrene block copolymers, styrene isobutylene block copolymers, styrene isoprene block copolymers, styrene ethylene propylene styrene block copolymers, styrene ethylene propylene block copolymers, and mixtures thereof.

17. The closure according to claim 1, wherein the at least one thermoplastic polymer of the at least one peripheral layer is selected from the group consisting of polyethylenes, metallocene catalyst polyethylenes, polybutanes, polybutylenes, polyurethanes, silicones, vinyl-based resins, thermoplastic elastomers, polyesters, ethylenic acrylic copolymers, ethylene-vinyl-acetate copolymers, ethylene-methyl-acrylate copolymers, thermoplastic polyurethanes, thermoplastic olefins, thermoplastic vulcanizates, flexible polyolefins, fluorelastomers, fluoropolymers, polytetrafluoroethylenes, and blends thereof, ethylene-butyl-acrylate copolymers, ethylene-propylene-rubber, styrene butadiene rubber, styrene butadiene block copolymers, ethylene-ethyl-acrylic copolymers, ionomers, polypropylenes, and copolymers of polypropylene and copolymerizable ethylenically unsaturated comonomers, olefin copolymers, olefin block copolymers, styrene ethylene butadiene styrene block copolymers, styrene ethylene butylene styrene block copolymers, styrene ethylene butylene block copolymers, styrene butadiene styrene block copolymers, styrene butadiene block copolymers, styrene isoprene styrene block copolymers, styrene isobutylene block copolymers, styrene isoprene block copolymers, styrene ethylene propylene styrene block copolymers, styrene ethylene propylene block copolymers, and mixtures thereof.

18. The closure according to claim 1, wherein the closure comprises a plurality of cells.

19. The closure according to claim 18, wherein the plurality of cells is a plurality of substantially closed cells.

20. The closure according to claim 18, wherein the plurality of cells comprises a cell size in a range of from about 0.025 mm to about 0.5 mm.

21. The closure according to claim 18, wherein at least one of a size or a distribution of the plurality of cells is substantially uniform throughout at least one of a length or a diameter of the core member.

22. The closure according to claim 18, wherein the core member comprises at least one of closed cells having an average cell size ranging from about 0.02 mm to about 0.50 mm or a cell density ranging from about 8,000 cells/cm$^3$ to about 25,000,000 cells/cm$^3$.

23. The closure according to claim 22, wherein the core member comprises at least one of an average cell size ranging from about 0.05 mm to about 0.1 mm or a cell density ranging from about 1,000,000 cells/cm$^3$ to about 8,000,000 cells/cm$^3$.

24. The closure according to claim 1, wherein the at least one peripheral layer is further defined as comprising a thickness ranging from 0.05 mm to 5 mm.

25. The closure according to claim 1, wherein the at least one peripheral layer is further defined as comprising a tough score and mar resistant surface.

26. The closure according to claim 1, wherein the at least one peripheral layer is further defined as comprising a density from 300 kg/m$^3$ to 1500 kg/m$^3$.

27. A substantially rod-shaped intermediate product for preparation of multi-component, substantially cylindrical closures configured for being inserted and securely retained in a portal-forming neck of a container, the substantially rod-shaped intermediate product comprising:

a. a core member comprising at least one thermoplastic polymer, b. at least one peripheral layer at least partially surrounding and intimately bonded to the core member, the at least one peripheral layer comprising at least one thermoplastic polymer, and c. printed indicia printed on a lateral surface of the core member or on a lateral surface of the at least one peripheral layer, wherein the printed indicia comprise a registration mark comprising invisible ink and defining a cutting position configured to be detected by a cutting machine, wherein the printed indicia further comprise decorative indicia that differ from the registration mark, that comprise visible ink, and that are non-interfering with the registration mark.

28. The substantially rod-shaped intermediate product according to claim 27, wherein the invisible ink is detectable by at least one of illumination with UV light; illumination with IR light; irradiation with emissions of an x-ray source; irradiation with emissions of a radio frequency source; heating the substantially rod-shaped intermediate product to temperatures in a range of from 40° C. to 200° C.; cooling the substantially rod-shaped intermediate product, in particular cooling the substantially rod-shaped intermediate product to temperatures below about 8° C.; or a chemical reaction of the invisible ink with a chemical reagent.

29. The substantially rod-shaped intermediate product according to claim 27, wherein the substantially rod-shaped intermediate product comprises a plurality of cells.

30. The substantially rod-shaped intermediate product according to claim 27, wherein the at least one peripheral layer is further defined as comprising a thickness ranging from 0.05 mm to 5 mm.

* * * * *